United States Patent
Gupta et al.

(10) Patent No.: US 8,578,261 B1
(45) Date of Patent: Nov. 5, 2013

(54) ACTIVE PREVIEW OF HYPERLINK CONTENT IN BROWSER SUPPORTED FILE-FORMAT

(75) Inventors: Niraj Gupta, Haryana (IN); Nitin Goel, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 982 days.

(21) Appl. No.: 11/767,064

(22) Filed: Jun. 22, 2007

(51) Int. Cl.
G06F 15/16 (2006.01)

(52) U.S. Cl.
USPC ............................ 715/208; 715/205; 715/207

(58) Field of Classification Search
USPC .................... 715/200, 205, 207, 208, 273
See application file for complete search history.

(56) References Cited

U.S. PATENT DOCUMENTS

| | | | | |
|---|---|---|---|---|
| 6,182,127 | B1 * | 1/2001 | Cronin et al. | 709/219 |
| 6,510,459 | B2 * | 1/2003 | Cronin et al. | 709/219 |
| 7,031,968 | B2 * | 4/2006 | Kremer et al. | 707/706 |
| 7,162,493 | B2 * | 1/2007 | Weiss et al. | 1/1 |
| 7,185,069 | B2 * | 2/2007 | Costin et al. | 709/219 |
| 2001/0032238 | A1 * | 10/2001 | Cronin et al. | 709/203 |
| 2002/0055926 | A1 * | 5/2002 | Dan et al. | 707/100 |
| 2002/0073058 | A1 * | 6/2002 | Kremer et al. | 707/1 |
| 2002/0152278 | A1 * | 10/2002 | Pontenzone et al. | 709/217 |
| 2003/0014415 | A1 * | 1/2003 | Weiss et al. | 707/10 |
| 2003/0078965 | A1 * | 4/2003 | Cocotis et al. | 709/203 |
| 2003/0079030 | A1 * | 4/2003 | Cocotis et al. | 709/229 |
| 2003/0158916 | A1 * | 8/2003 | Cronin et al. | 709/219 |
| 2005/0010860 | A1 * | 1/2005 | Weiss et al. | 715/500.1 |
| 2006/0294251 | A1 * | 12/2006 | Cocotis et al. | 709/229 |
| 2007/0011258 | A1 * | 1/2007 | Khoo | 709/206 |
| 2007/0022180 | A1 * | 1/2007 | Cocotis et al. | 709/217 |
| 2007/0168514 | A1 * | 7/2007 | Cocotis et al. | 709/225 |
| 2008/0005247 | A9 * | 1/2008 | Khoo | 709/206 |

* cited by examiner

*Primary Examiner* — Stephen Hong
*Assistant Examiner* — Gregory J Vaughn
(74) *Attorney, Agent, or Firm* — Schwegman Lundberg Woessner P.A.

(57) ABSTRACT

In one embodiment, a method is illustrated as including receiving a digital content request relating to digital content accessible using a resource identifier, retrieving the digital content using the resource identifier, converting the digital content into formatted digital content having a file format different from that of the digital content, and compatible to be displayed in a preview frame, and transmitting the formatted digital content. Further, in some embodiments, a method is illustrated as including receiving a search result containing a resource identifier, extracting the resource identifier from the search result, and associating a file format description with the resource identifier, and displaying the search result and the file format description.

32 Claims, 21 Drawing Sheets

FIG. 3

```
<?XML VERSION="1.0"?>
<NOTE XMLNS="HTTP://
WWW.SEARCH_SERVER.COM"
XMLNS:XSI="HTTP://WWW.W3.ORG/2001/
XMLSCHEMA-INSTANCE"
XSI:SCHEMALOCATION="HTTP://
WWW.SEARCH_SERVER.COM RESULT.XSD">
  <SEARCH RESULT>            301
    <RESULT>
      <RESULT NAME> COMPUTER ANIMATION </RESULT NAME>
  302  <FILE FORMAT> PPT </FILE FORMAT>
      <TEXT> COMPUTER ANIMATION POWER POINTS PROVIDE
DETAILS REGARDING HOW TO GENERATE COMPUTER ANIMATION </TEXT>
      303 <CONTENT LOCATION> HTTP://WWW.COMPUTERANIMAT.COM/
COMPUTER_ANIMATION.PPT </CONTENT LOCATION>
    </RESULT>
    <RESULT>
      <RESULT NAME> COMPUTER ANIMATION </RESULT NAME>
  304  <FILE FORMAT> SWF </FILE FORMAT>
      <TEXT> ONE WAY TO EXPLAIN COMPUTER ANIMATION IS
THROUGH SEEING THE ACTUAL ANIMATION </TEXT>
      305 <CONTENT LOCATION> HTTP://WWW.SEARCH_SERVER.COM/
COMPUTER_AMINATION.SWF </CONTENT LOCATION>
    </RESULT>
    <RESULT>
      <RESULT NAME> COMPUTER ANIMATION WHITEPAPER </RESULT
NAME>
  306  <FILE FORMAT> PDF </FILE FORMAT>
      <TEXT> COMPUTER ANIMATION AS EXPRESSED IN A
WHITEPAPER SUBMITTED TO ACM... </TEXT>
      307 <CONTENT LOCATION> HTTP://WWW.SEARCH_SERVER.COM/
ADVANCES_IN_COMPUTER_ANIMATION.PDF </CONTENT LOCATION>
    </RESULT>
  </SEARCH RESULT>
```

```
<title>SALES OVERVIEW</title>
<session>
    <group language=en lipsync>
        <switch>
            <track type=audio
                e="PCMU/8000/1"
  501         src = "rtsp://audio.webservices.com/salesoverview/audio.en/lofi">
            <track type=audio
                e="DVI5/16000/2" pt="90 DVI5/8000/1"
                src="rtsp://audio.webservices.com/salesoverview/audio.en/hifi">
        </switch>
        <track type="video/mpeg"
            src="rtsp://video.webservices.com/homemovies/video">
  502     <preview frame data>
            <height> 100 </height>
            <width> 100 </width>
        </preview frame data>
  503     <plug-in supported>
            <flash> yes </flash>
            <power point> no </power point>
            <portable document format> yes </portable document format>
        </plug-in supported>
</session>
```

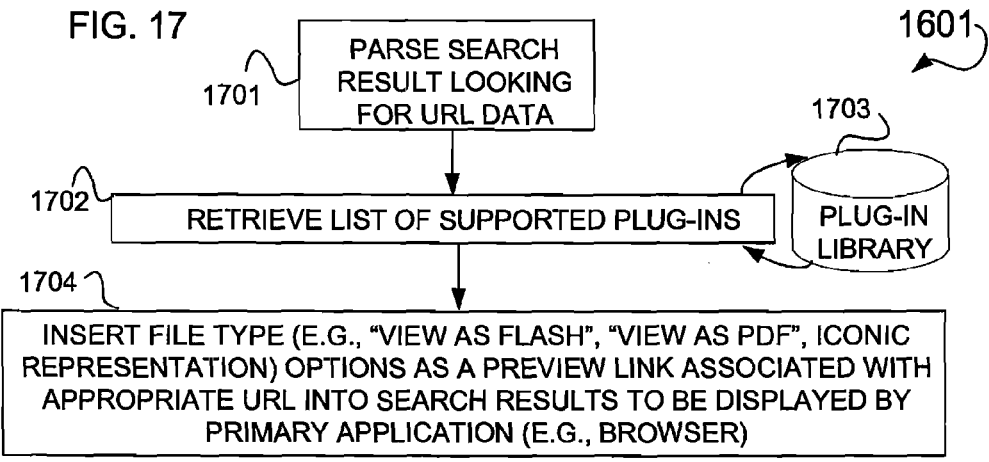
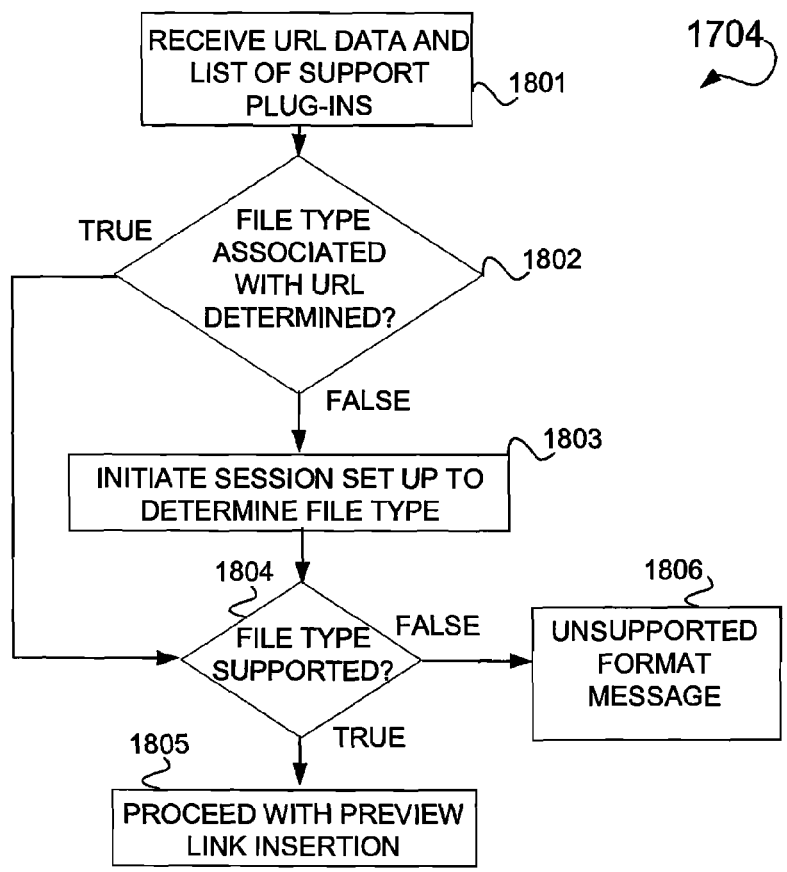

ACTIVE PREVIEW OF HYPERLINK CONTENT IN BROWSER SUPPORTED FILE-FORMAT

COPYRIGHT

A portion of the disclosure of this document contains material that is subject to copyright protection. The copyright owner has no objection to the facsimile reproduction by any one of the patent document or the patent disclosure, as it appears in the Patent and Trademark Office patent files or records, but otherwise reserves all copyright rights whatsoever. The following notice applies to the software, data, and/or screenshots that may be described below and in the drawings that form a part of this document: Copyright© 2007, Adobe Systems Incorporated. All Rights Reserved.

TECHNICAL FIELD

Example embodiments relate generally to the technical field of algorithms and programming and, in one specific example, to the generation and use of preview data to view and select data displayed as part of digital content.

BACKGROUND

Uniform Resource Locator (URL) values may be embedded in digital content and represented as text in this digital content. These URL values allow a user to access digital content in the form of Web pages, files, and other types of digital content. The digital content into which these URL values are embedded may include Web pages, e-mails, and other types of digital content.

BRIEF DESCRIPTION OF THE DRAWINGS

Some embodiments are illustrated by way of example and not limitation in the figures of the accompanying drawings in which:

FIG. 3 is a diagram of a search result as received by a proxy server or one or more devices written in some type of language, according to an example embodiment.

FIG. 5 is a diagram of a session setup packet, according to an example embodiment.

FIG. 17 is a flowchart illustrating an example method used to execute operation that receives the search results, according to an example embodiment.

FIG. 18 is a flowchart illustrating an example method used to execute an operation that inserts a file type as a preview link (e.g., as one or more textual or iconic representations) to be associated with an appropriate URL value, according to an example embodiment.

DETAILED DESCRIPTION

Figure 1:
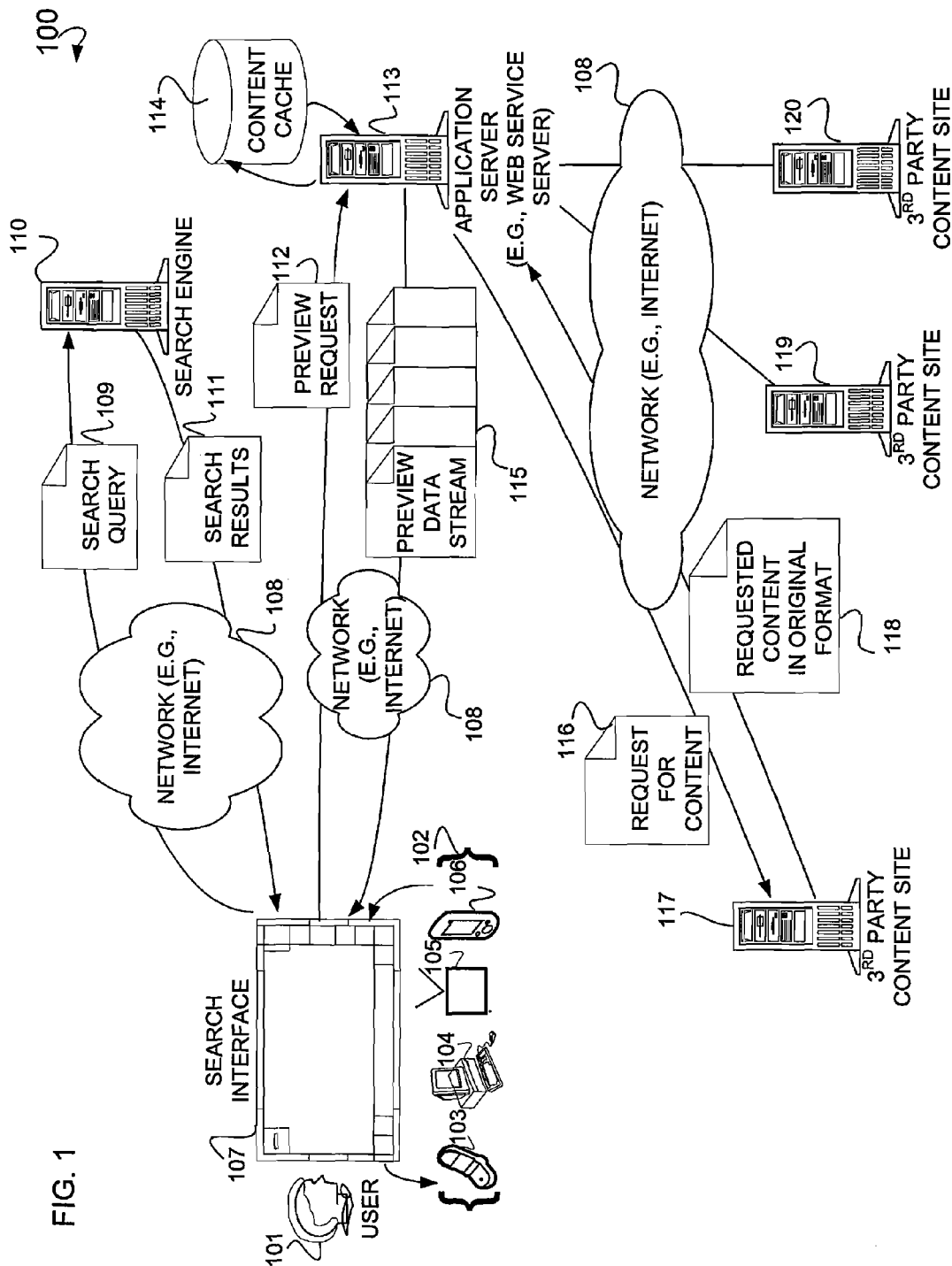
FIG. 1 is a system diagram of a system used to request, generate, and display preview data, according to an example embodiment.

Example methods and systems to view digital content (e.g., preview data) through a preview frame (e.g., a geometric shape such as a rectangle, oval, triangle, or some other suitable geometric shape to be used to form the boundaries of a display area) is illustrated. In the following illustration, for purposes of explanation, numerous specific details are set forth to provide a thorough understanding of example embodiments. It will be evident, however, to one skilled in the art that the present invention may be practiced without these specific details.

There are millions of hyper-links over the net that corresponds to some digital content (e.g., document content). In one scenario, however, a user might face problems in viewing the digital content associated with these hyper-links, if the user does not have the corresponding viewer/application available that supports the file-format of the digital content associated with the hyper-link. In another scenario, this may be true even if a viewer/application is available that might require the user to first download the digital content onto a client computer system and then launch it in corresponding viewer. As to the first scenario, the user may be wholly unable to view a piece of digital content accessible via a hyper-link. With regard to the second scenario, the user may have a non-smooth or disruptive user experience as a result of having to download the digital content prior to viewing.

For example, consider the case where a user does not have MICROSOFT OFFICE™ installed on their computer system. The user may find it impossible to view the content of any hyper-link to a MICROSOFT POWERPOINT™ file. And again, consider the case where a user has MICROSOFT OFFICE™ installed on their machine, but the user will have to download the hyper-linked digital content (e.g., a PPT™ file) on their local computer system to view its content. Here the user may experience a non-smooth flow, since logically, as a Web user, the user might like to view the Web content in a Web browser itself, requiring the user to be prompted as to whether or not they want to download the digital content or not. This case is very noticeable when searching, where a user might like to view the digital content first (e.g., if the search result is a document file), instead of downloading it without judging the relevance of the digital content.

In some embodiments, a user conducting an on-line search may want to preview digital content linked to the various search results. This preview will allow the user to review this digital content without having to leave the Web page displaying the search result. In some cases, the user will be able to sample the digital content associated with multiple search results. In one embodiment, the user will use a preview frame to sample this digital content. The preview frame may be a plug-in or other suitable browser associated application written in, for example, the JAVA™ or JAVA SCRIPT™ programming language. The preview frame may be executed by the user associating a pointer (e.g., a selection indicia) position determined via an input device such as a mouse with the location of a Web page as illustrated in a search result (e.g., a resource identifier in the form of a URL) embedded in the search result. Further, a mouse-out may de-activate the preview pre-view frame, wherein the selection indicium is no longer in close proximity to the URL. In some cases, the URL may be represented as a preview link (e.g., a file format description) in the form of text (e.g., a textual representations) displaying the format of the digital content pointed to by the URL (e.g., it may say "View as PPT," "View as PDF," "View as Flash", "Preview" etc.) Moreover, in some cases, the URL may be represented as a preview link (e.g., a file format description) in the form of an icon (e.g., an iconic representation) displaying the format of the digital content pointed to by the URL. A preview request may be then sent out to a Web services server that may retrieve the requested preview data. In some cases, once retrieved, the preview data may be converted into some type of suitable format that the preview frame may be able to use (e.g., that may be displayable in the preview frame).

Some example embodiments allow the user to view the digital content pointed to by the hyper-links without losing the focus from the current view of the Web page. Specifically, the user may not lose focus because the preview frame may allow the user to view the content pointed to by a URL without having to open the hyper-link in same or another window and/or without downloading the entire content file on his local computer system. Further, in some cases, the user may be able to view the hyper-linked digital content even if the current file-format viewer is not installed on his/her local computer system.

Some embodiments may include allowing a user to view a preview of the hyper-linked digital content in a browser supported file-format or via a viewer plugged into a browser application. This embodiment may enable a user to view and navigate through the content within the preview window without losing the focus of current Web page view that embeds the hyper-link.

In some embodiments, a preview frame is generated when a user does a mouse-over over any hyper-link and displays the hyper-link content in one of the browser supported file-formats. Example embodiments may include the use of ACTIVE-X™ content technology. As will be more fully illustrated below, the hyper-link may reside not only within a search results, but may also reside as part of an e-mail (e.g., an HTML based e-mail message) or even an electronic document. For example, if user performs a mouse-over on a hyper-link to a PPT file contained in an e-mail, then the user may activate a preview frame displaying a preview of the PPT file as a Portable Document Format (PDF™), or Small Web Format (SWF™) data stream or file. This preview frame may display this preview without the user losing the current view of the Web page.

In one embodiment, this preview frame may be implemented as a part of a Web service that serves a user through, for example:

Serving a request for converting a file from its current file format to a requested file format. This conversion may be accomplished through first downloading the file from, for example, a third party content provider, the file identified by a URL. Next, this file may be converted to some other file-format supported by the requesting party. Then, this converted content is sent as a response for ultimate viewing in the preview frame.

Maintaining a cache of the converted content indexed against a corresponding file URL to allow the further views of same content within the preview frame.

Managing a cache content on the basis of its demand, aging, and/or other predefined criteria.

In some cases, conversion may take place at runtime, or at indexing, or at indexing time, and may determine an optimal conversion process. Additionally, in some embodiments, the conversion may occur via a second party hosting service.

Some embodiments may include a host page that may contain at least one link to a piece of digital content, wherein the link points to at least one digital content file. More than one file format may be used to view the digital content file such that the user may move between one or more of these file formats using the selection indicia to select the URL displayed as text and/or as an icon. Further, in some embodiments, the host page may be a file itself, and the host page may be modified to reveal the available second file options that the preview frame may present.

Example embodiments may include the second file format being a resolution independent, animatable graphics based format (e.g., which is scriptable), and the secondary content and/or styling (text, video, effects, audio) applied to the source content, a layer of the source content or to the chrome may also be implemented. In some embodiments, transformed alternate views may also be implemented including conversion to audio; the display of hot links from the source file is maintained and actionable within the secondary content display. Further, the secondary file may be downloadable to disk, and the download could be a costed, monetized service, and may be applied to search pages or other hosted content (e.g., hosted email attachments).

Example Systems and Protocols

FIG. 1 is a system diagram 100 of an example system used to request, generate, and display preview data. Illustrated is a user 101 who, using any one of the client devices 102, generates a search query 109. These one or more client devices 102 may include for example, a cell phone 103, a computer system 104, a television 105, or a Personal Digital Assistant (PDA) 106. Residing on any one of these client devices 102 is a search interface 107. The search interface 107 may, for example, be a Graphical User Interface (GUI) or some other type of interface that allows the user 101 to generate the search query 109. This search interface 107 may be a commercially available browser application such as INTERNET EXPLORER™, MOZILLA FIREFOX™, SAFARI™, OPERA™, or some other suitable browser application. The search query 109 generated with the assistance of the search interface 107 is transmitted across a network 108 to a search engine 110. The search engine 110 may be any one of a number of recognized search engines, such as the YAHOO!™ search engine, the GOOGLE™ search engine, the DOG PILE™ search engine, or some other suitable search engine. In response to the search query 109, the search engine 110 transmits a search result 111 back across the network 108 for display in the search interface 107. In some embodiments, a user using some type of input/output device, such as a mouse, may for example roll a graphically illustrated a selection indicia over one or more of the search results. Once the user 101 rolls this selection indicia over one or more of the search results, a preview request 112 is generated and transmitted across the network 108 to an application server 113. This application server 113 may, for example, have certain functionality including the providing of certain Web services. Operatively coupled to this application server 113 may be a content cache 114. During the course of, for example, using this selection indicia to perform a roll-over, a preview frame may be generated that may appear within the search interface as a window that may be smaller in area than the search interface 107. In response to the preview request 112, a preview data stream 115 is generated and transmitted by the application server 113 back across the network 108 for displaying in the preview frame.

Some example embodiments may include retrieving the data for the preview data stream 115 from the content cache 114. This content cache 114 may reside natively on the application server 113, or may be managed by a database application that is operatively coupled to the application server 113 that, in turn, manages the content cache 114. In some embodiments, a plurality of application servers 113 may be used in lieu of a singular application server 113. Similarly, a plurality of content caches may be operatively coupled to each of the plurality of application servers 113. In certain cases, the data for the preview data stream 115 may not be contained in the content cache 114. In those circumstances, the application server 113 may generate a request for content 116 that will be transmitted across the network 108 to, for example, a third-party content site 117, 119, or 120. This request for content may be, for example, a request for content generated in using, for example, a Hypertext Transfer Protocol (HTTP), or, in certain cases, a Real Time Streaming Protocol (RTSP) where the content is audio, video, or audio-video content. In response to the request for content 116 being generated, the requested content in its original format illustrated as 118 is transmitted back across the network 108 to the application server 113. In certain cases, the application server 113 will then make a determination as to whether the requested content needs to be converted from its original format to a format that is supported by, for example, one or more of the client devices 102. This notion of conversion and retrieval from third-party sites will be more fully discussed below.

Figure 2:
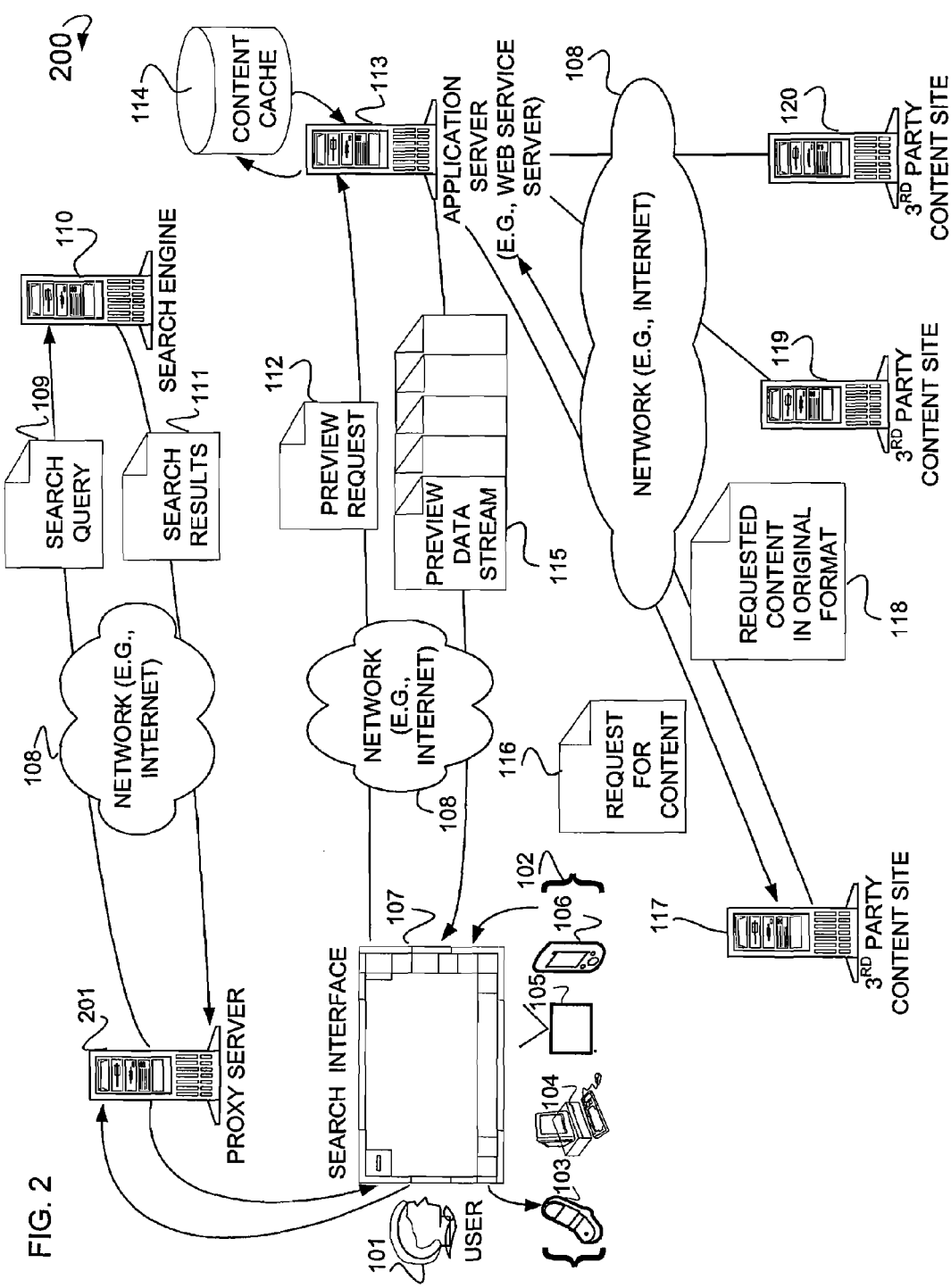
FIG. 2 is a system diagram illustrating the use of a proxy server to mediate the relationship between one or more devices, search engines, and application servers, according to an example embodiment.

FIG. 2 is an example system diagram 200 illustrating the use of a proxy server to mediate the relationship between the previously illustrated one or more client devices 102, search engine 110, and application server 113. Illustrated is a proxy server 201 through which the previously illustrated search query 109 is transmitted across the network 108 to the search engine 110. In response to the search query 109, a search result 111 is transmitted by the search engine 110 back across the network 108 to the proxy server 201. In some cases, when the search result 111 is received by the proxy server 201, the proxy server 201 may modify the search result. This modification may take the form of extracting a URL value and replacing it with a preview link. Further, in cases where the user 101 performs a roll over or other type of input function to generate a preview frame, the preview request 112 is generated and transmitted by the one or more client devices 102 across the network 108 to the previously illustrated application server 113, or plurality of proxy servers 113. In response, a preview data stream 115 is generated by the application server 113 and transmitted back across the network 108 to the one or more devices 102. This preview data stream 115 may contain data from, for example, the previously illustrated content cache 114, or from one or more of the third-party content sites (e.g., 117, 119, or 120).

In some embodiments, the proxy server 201 may act to set up a session between the one or more client devices 102, and one or more application servers 113. For example, the proxy server 201 may act to mediate between the search engine 110, and the one or more client device 102. This mediation may take the form of modifying the search results 111 (e.g., the search results provided in the form of one or more web pages) by inserting preview links into a web page containing search results, wherein these preview links are associated with a resource identifier (e.g., a URL). In certain cases, these preview links may be implemented using Hyper Text markup Language (HTML) based iFrame technology. Further, in some cases, once the search result 111 is modified and provided to the one or more device 102, the one or more devices 102 and the application server 113 interact directly, without the mediating role of the proxy server 201.

In some embodiments, the functionality and logic for generating a search query 109, receiving a search result 111, generating a preview request 112, generating a preview frame, and the receiving of a preview data stream 115 all resides on the proxy server 201 such that the one or more devices 102 take up the role of, for example, a dummy terminal.

FIG. 3 is a diagram of an example search result 111 as received by, for example, the proxy server 201 or one or more devices 102. Illustrated is a search result 111 written in some type of language, such as for example an eXtensible Markup Language (XML), a HTML, or some other suitable language or markup language. Shown within the search result 111 is a XML-Schema Definition (XSD) location 301 containing the location of a schema or model that may be used to interpret, parse, or otherwise read the XML formatted data contained in the search result 111. In some embodiments, a Document Definition Type (DTD) may be used in lieu of a XSD. Further illustrated is a number of XML based tags. For example, a file format tag 302 is shown containing a reference to a PPT file. Further illustrated is a content location tag 303 describing the location of a particular piece of requested digital content. Also illustrated, is a further tag in the form of a file format tag 304 containing textual data illustrating another file format, which in this case is SWF. As with content location tag 303, a further content location tag 305 is illustrated containing the location of the SWF file. A further file format tag 306 is also illustrated containing textual data relating to a file format in the form of a PDF™ format. A further content location tag 307 illustrates where this PDF™ file may be found. In some embodiments, these various file format tags and content location tags may be used to generate viewable text, and, more particularly, a hyperlink reference shown in association with the viewable text in the form of a preview link such that a user may click on, roll over, or otherwise select the hyperlink for the purposes of previewing content through a preview frame. This preview link will be illustrated more fully below.

In some embodiments, the file format tags 302, 304, and 306 may be optional in cases where the file format is defined by the data contained in the content location tags 303, 305, and 307. Specifically, in certain instances the file format may be defined within the location of a particular piece of requested digital content. In other cases, however, this file format may not be defined, such that the file format tags 302, 304, and 306 may be necessary. In still other cases, the file format tags may not be provided and the content location tags may not provide the information necessary to make a determination of the file format that may be used. In such cases, the a session set up may be initiated to determine the file format or type.

Figure 4:
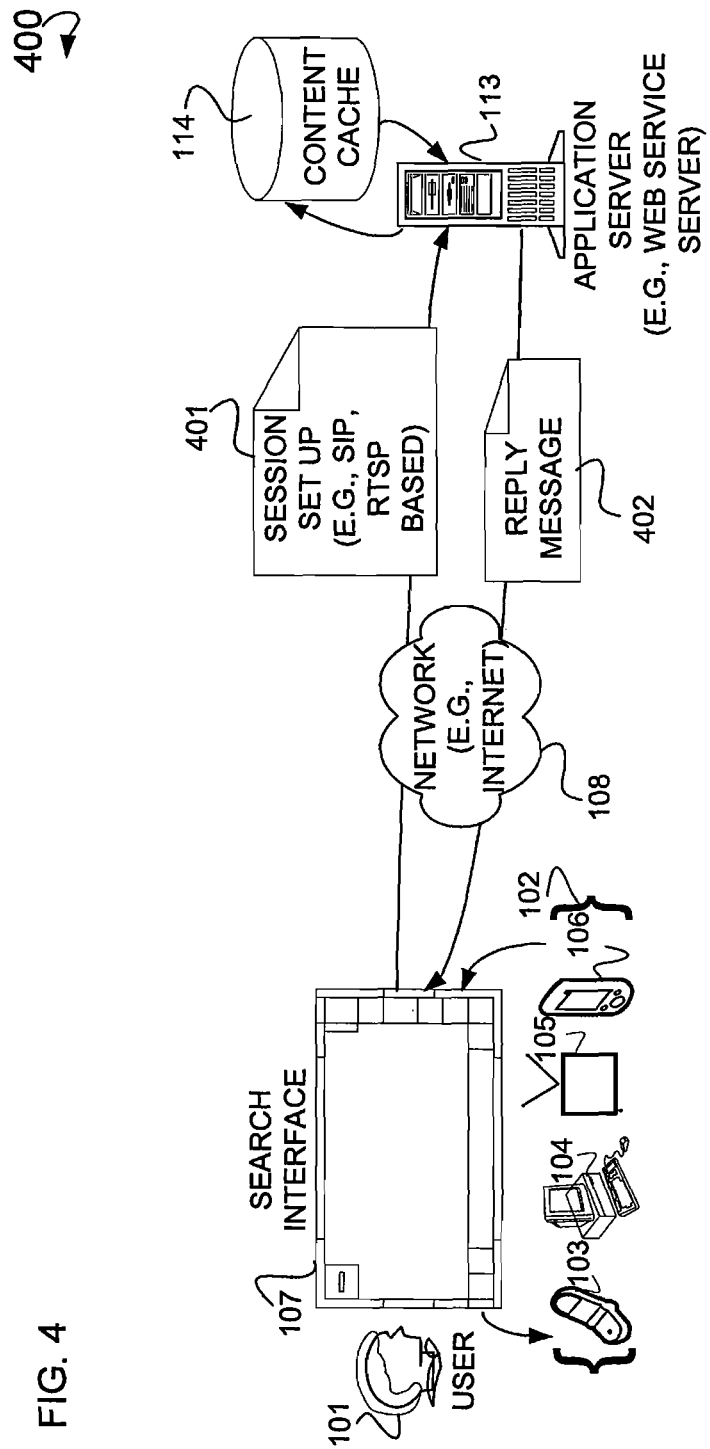
FIG. 4 is a system diagram illustrating some of the protocols used to generate a preview frame, according to an example embodiment.

FIG. 4 is an example system diagram 400 illustrating some of the protocols used to generate a preview frame. Illustrated is a session setup packet 401 that is generated by a user 101 using the search interface 107. This session setup packet 401 may use protocols such as a Session Initiation Protocol (SIP), the RTSP protocol, or some other suitable protocol used to set up the streaming of data such as the preview data stream 115. In response to this session setup packet 401, a reply message 402 is transmitted by the application server 113 back across the network 108 to one or more of the devices 102. Contained within the reply message may be a confirmation list of supported CODECs and other relevant information. This reply message 402 may then confirm the setting up of a session through which the preview data stream 115 may be transmitted. In certain cases, these various protocols may be used in conjunction with certain principles of socket programming to denote ports to be used by the receiving plug-in and/or other applications used to generate the preview frame.

FIG. 5 is an example diagram of a session setup packet 401. Illustrated as a session setup packet 401 written using the RTSP protocol. Shown is a link 501, illustrating the location (e.g., as a URL value) of audio data associated with the preview request 112. Also shown is a preview frame data tag 502 illustrating the height and width of the preview frame through which the user 101 will review the preview data stream 115. Also illustrated is a plug-in supported tag 503 illustrating the various plug-ins that are supported and/or formats that are supported by the one or more devices 102. Here, for example, the FLASH™ format is supported, whereas the PowerPoint format is not supported, and further the PDF™ format is supported.

Example Interfaces

Figure 6:
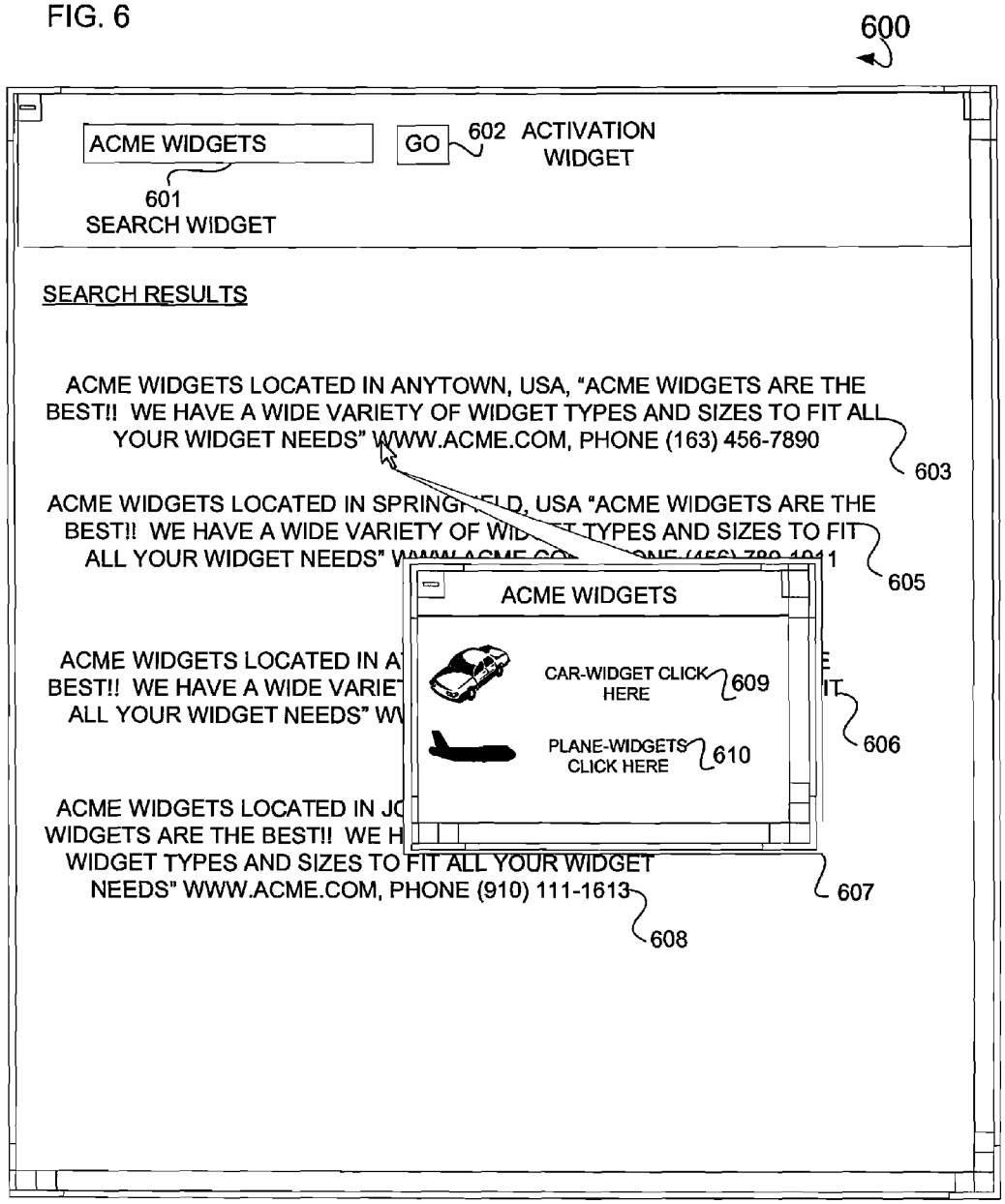
FIG. 6 is a Graphical User Interface (GUI) illustrating search results in combination with a preview data stream as displayed in a preview frame, according to an example embodiment.

FIG. 6 is an example GUI 600 illustrating both the search results 111 in combination with the preview data stream 115 as displayed in a preview frame. Shown is a search widget 601 wherein a user 101 may enter a particular search query (e.g., search query 109). Further, an activation widget is 602 is also illustrated. Once the user 101 enters the search query 109 into the search widget 601 and then clicks on the activation widget 602, a search result or series of search results 111 may be returned and displayed. This display may take place in the search interface 107, for example. The search results may be, for example, the search result 603, 605, 606, or 608. Once the search result 111 is received by the one or more devices 102 or proxy server 201, the URL value for each of the search results (e.g., 603, 605, 606, or 608) may be substituted with a preview link in the form of a textual description of the particular file format associated with the URL. However, as is depicted here in FIG. 6, the search results may merely display the URL value itself. Once the URL value is displayed, a user 101 may be free to perform a mouse-over, or other type of input/output operation such that a preview frame 607 is generated and displayed. Illustrated within this preview frame 607 is, for example, a further search result 609 and search result 610, or more accurately a link 609 and link 610. These links 609 and 610 are links that appear on the Web page associated with the URL value associated with the search result 603. In some cases the complete Web page associated with the URL value for the search result 603 may be displayed in the preview frame 607. In other cases, only certain portions of the Web page associated with URL illustrated in search result 603 may be shown. The dimensions of preview frame 607 may be determined by the user 101 at setup time such that the preview frame 607 may take up more or less area of the search interface 107, or as illustrated here the GUI 600.

In some embodiments, preview frame 607 is generated using technologies including Asynchronous JavaScript and XML (AJAX), Dynamic HTML (DHTML), Java applet, or other suitable technology. For example, upon the mouse-over of a URL value written in XML, a piece of JavaScript code may be executed that retrieves certain types of preview frame data. This preview frame data may include certain user-based settings including the area of the preview frame, default view functionality (e.g., whether media player buttons will appear by default, whether a certain plug-in will be a default plug-in etc.), whether multiple preview frames may appear, and other suitable functionality. After the preview frame data is retrieved, the window for the preview frame is generated based on this retrieved data. Once generated, the preview data stream is received, decoded, and placed into a buffer for playing in the preview frame. Once the preview data contained in the buffer is exhausted (e.g., played), then an additional call is made to the application server 113 for additional preview data. In certain cases, principles of socket programming may be applied such that the preview frame data may by sent to a particular port.

Figure 7:
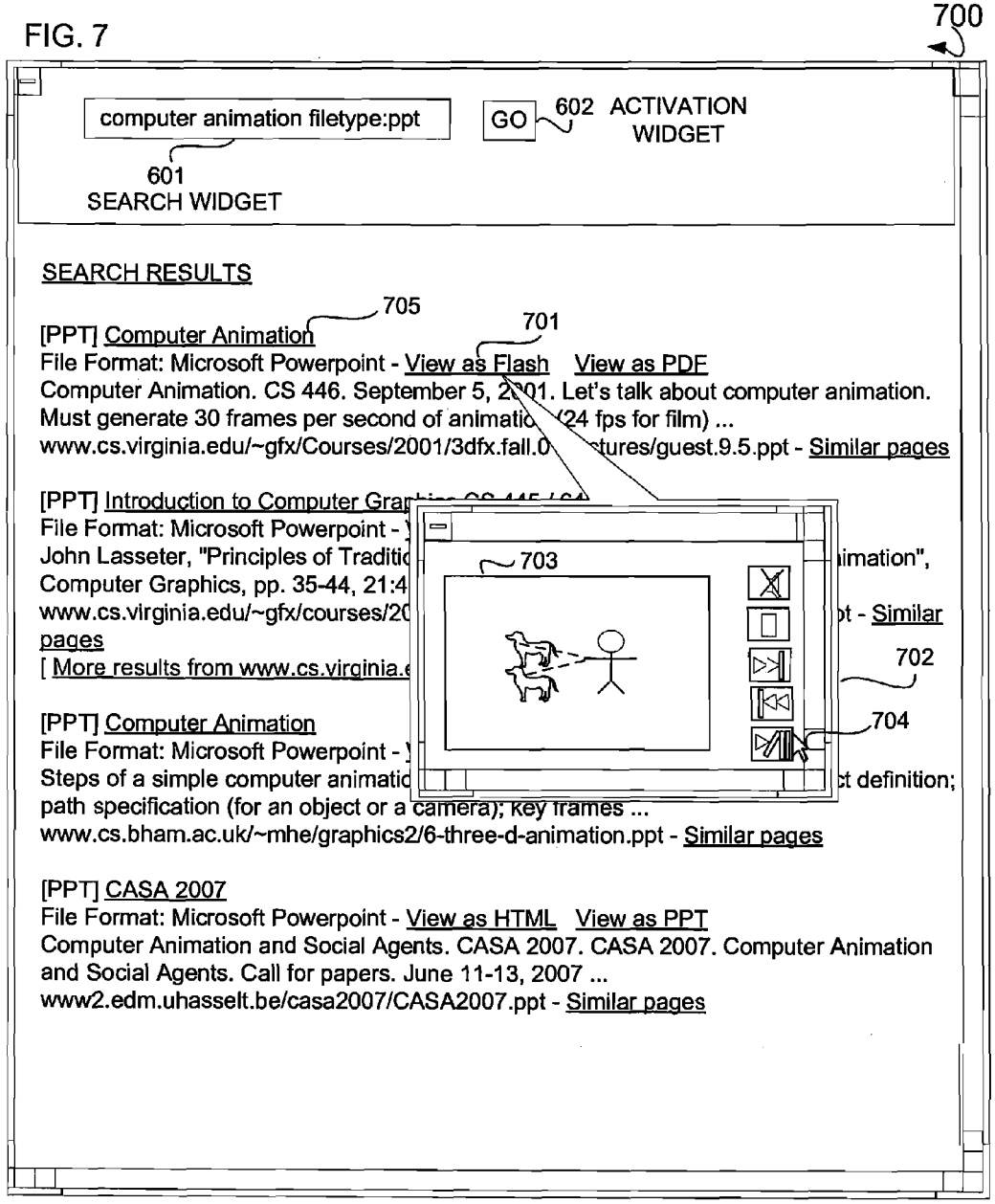
FIG. 7 is a GUI illustrating various search results and textual representations of URL values, according to an example embodiment.

FIG. 7 is an example GUI 700 illustrating various search results and preview links in the form of textual representations of URL values. Illustrated is a search result 705 with a textual representation 701 referencing the search result and content associated with that search result. For example, here the textual representation 701 titled "View as Flash" denotes that the search result 705 may be viewed as a FLASH™ file or data stream in the preview frame 702. With regard to the preview frame 702, a group of media player functions 704 are depicted such that if the user 101 decides to preview the preview data stream (e.g., here a flash-based preview data stream) associated with the search result 705, they may do so using various media player functions (e.g., stop, play, fast forward, reverse, and mute sound). Illustrated within the preview frame 702 is a display area 703 depicting an image arising from the streaming of the preview data 115 ultimately to the preview frame 702.

Figure 8:
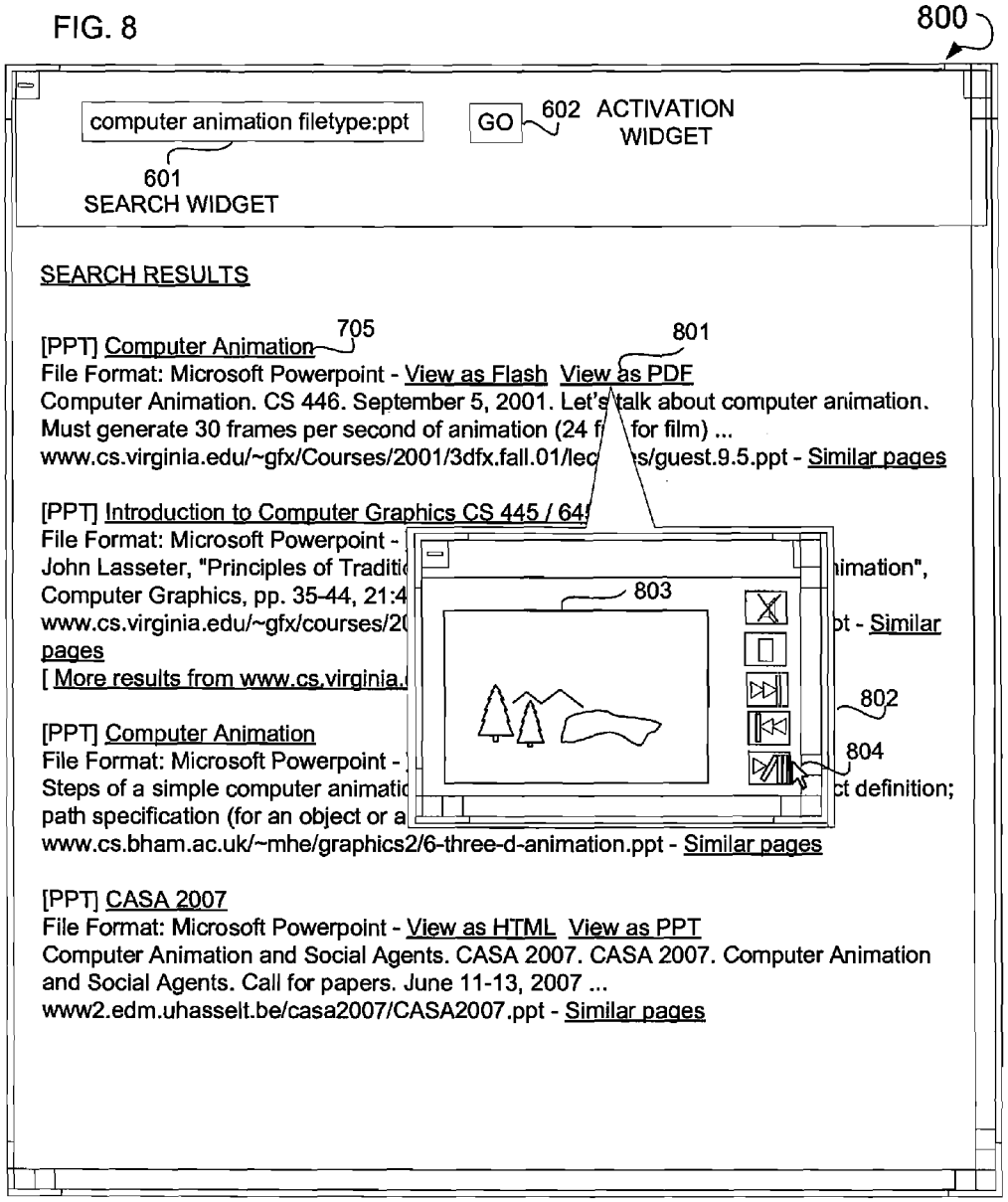
FIG. 8 is a GUI illustrating a search result viewed as a PDF™ file in a preview frame, according to an example embodiment.

FIG. 8 is an example GUI 800 illustrating the search result 705 viewed as a PDF™. Shown is a preview link in the form of a textual description 801 of a URL associated with the search result 705 wherein the search result 705 may be a "Viewed as a PDF" file. Using the preview frame 802, a user, such as user 101, may view a search result as a PDF™ file as opposed to a FLASH™ file in the preview frame 802. Again illustrated is a series of media player buttons or a group of media player buttons 804 that may be used in this case to view a PDF™ file as opposed to a flash-based data stream (e.g., an SWF file). This PDF™ is displayed in display area 803.

Figure 9:
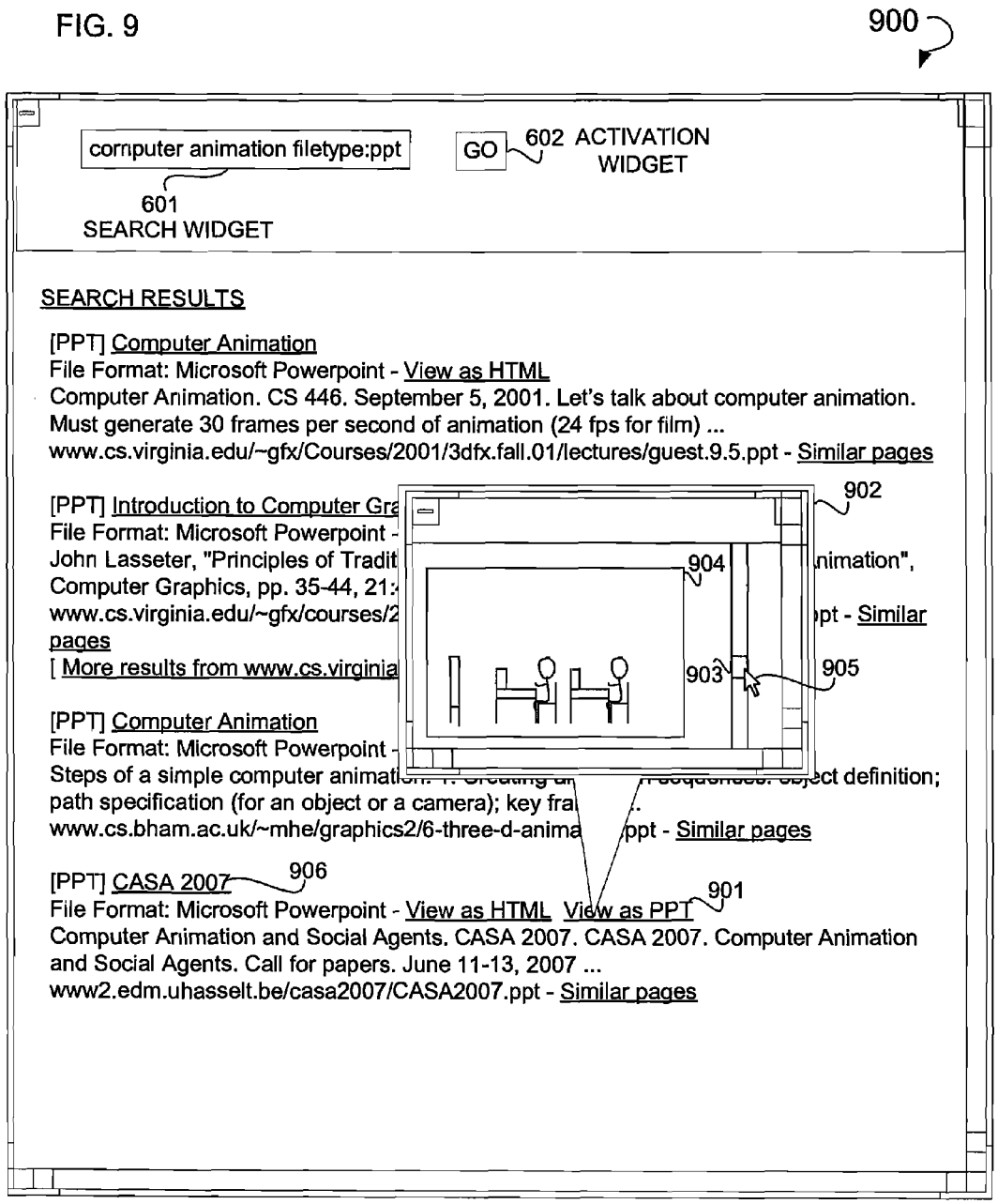
FIG. 9 is a GUI illustrating the display of slides associated with the POWERPOINT™ (PPT™) file within a preview frame, according to an example embodiment.

FIG. 9 is an example GUI 900 illustrating the display of slides associated with the PPT file within a preview frame 902. Shown is a search result 906 wherein a preview link in the form of a textual description 901 states "View as PPT" as a way to view the data associated with the textual description and underlying URL value. In some cases, the text description 901 may be an icon (see e.g., FIG. 10 below) or other suitable text (e.g. "View as Slide", or "Preview"). Once accessed by, for example, a user 101, one or more of the slides associated with the PPT file may be displayed in a preview frame 902, and, more particularly, in the display area 904. A user 101 using a selection indicia 905 may be able to manipulate, for example, a scroll bar 903 to scroll through the various slides associated with PPT, jump from one slide to another slide in order, out of order, and in any order user 101 deems necessary. In some embodiments, the slides associated with the PPT file are individually sent as a preview data stream 115 to the one or more devices 102 using the search interface 107. Put another way, in some embodiments the entire PPT file is not provided for viewing within the preview frame 902, rather only individual slides are provided. In some cases, this process for sending individual slides may involve converting, for example, the PPT file to a FLASH™ file or PDF™ file prior to sending the slide to the preview frame.

Figure 10:
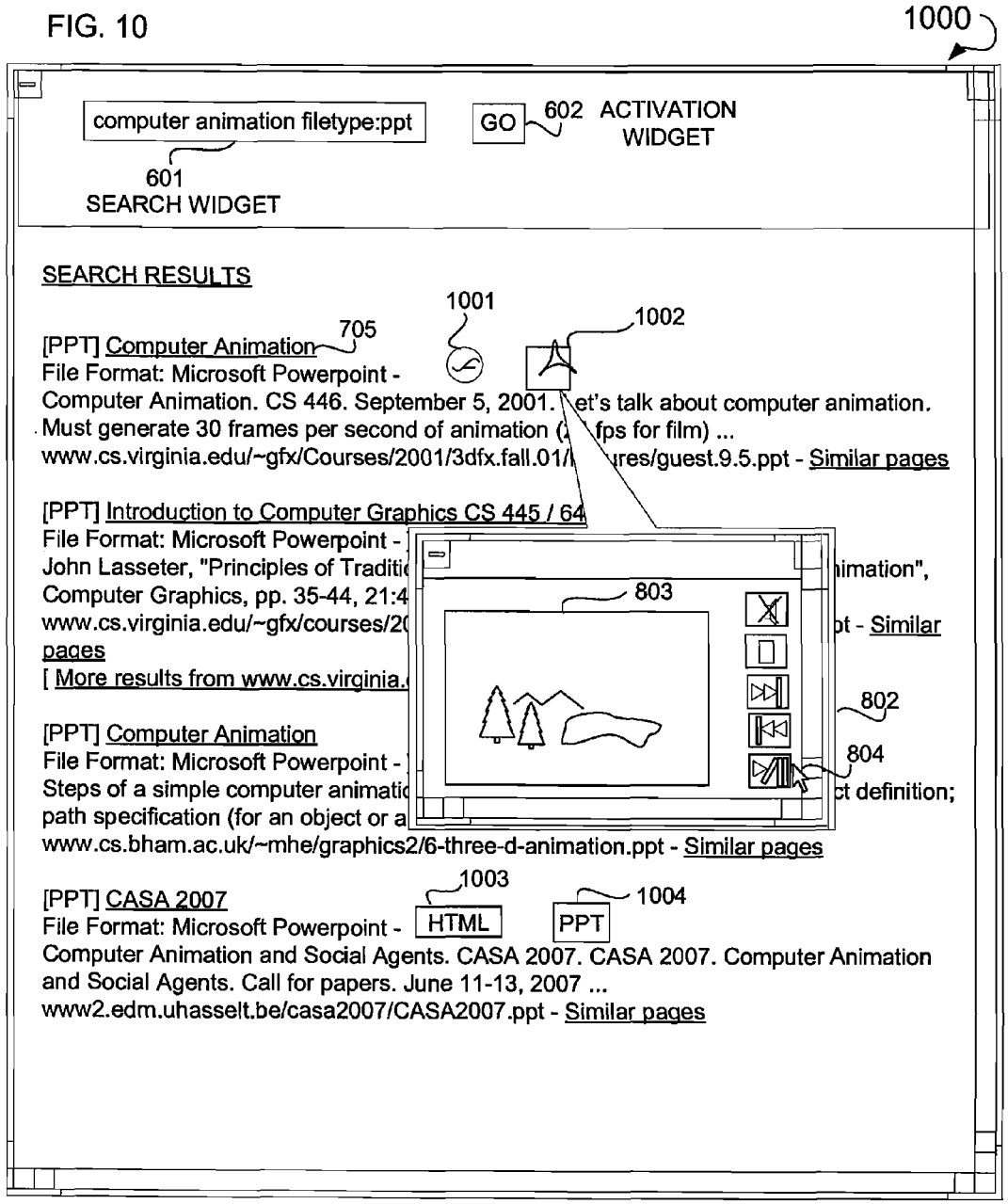
FIG. 10 is a GUI illustrating the use and execution of preview links in the form of iconic representations, according to an example embodiment.

FIG. 10 is an example GUI 1000 illustrating the use and execution of preview links in the form of iconic representations. Illustrated is a preview link 1001 in the form of an iconic representation showing a link to a FLASH™ file, and a preview link 1002 illustrating an iconic representation of a preview link to a PDF™ file. Further illustrated are preview links 1003 (e.g., an icon representing a HTML file) and a preview link 1004 (e.g., an icon representing a PPT™ file). Also shown is the execution of the preview link 1002 that results in the display of the previously illustrated preview frame 802.

Figure 11:
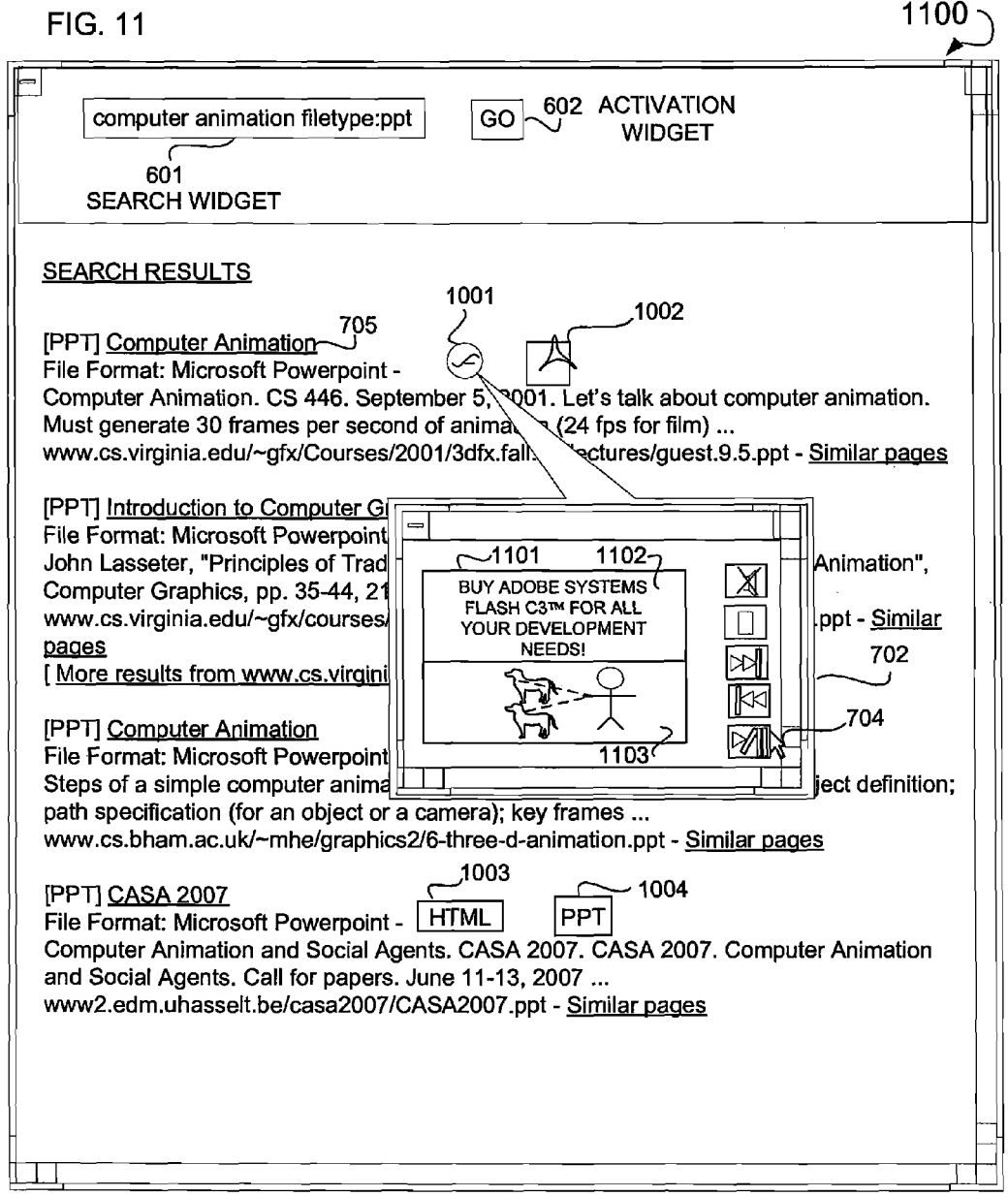
FIG. 11 is a GUI illustrating the use and execution of preview links in the form of iconic representations to generate advertisements, according to an example embodiment.

FIG. 11 is an example GUI 1100 illustrating the use and execution of preview links in the form of iconic representations to generate advertisements. Shown is an advertisement that fetched and displayed when the preview link 1001 is executed. This advertisement is displayed in display area 1101, wherein this display area 1101 is split into a frame 1102 and a frame 1103. Here the frame 1102 contains the advertisement, while the frame 1103 contains the previewed content. As more fully illustrated below, this advertisement may be fetched from the application server 113, or from a separate remotely located application server. Further, this advertisement may be fetched before, after, or contemporaneous with the data contained in the preview data stream 115.

Figure 12:
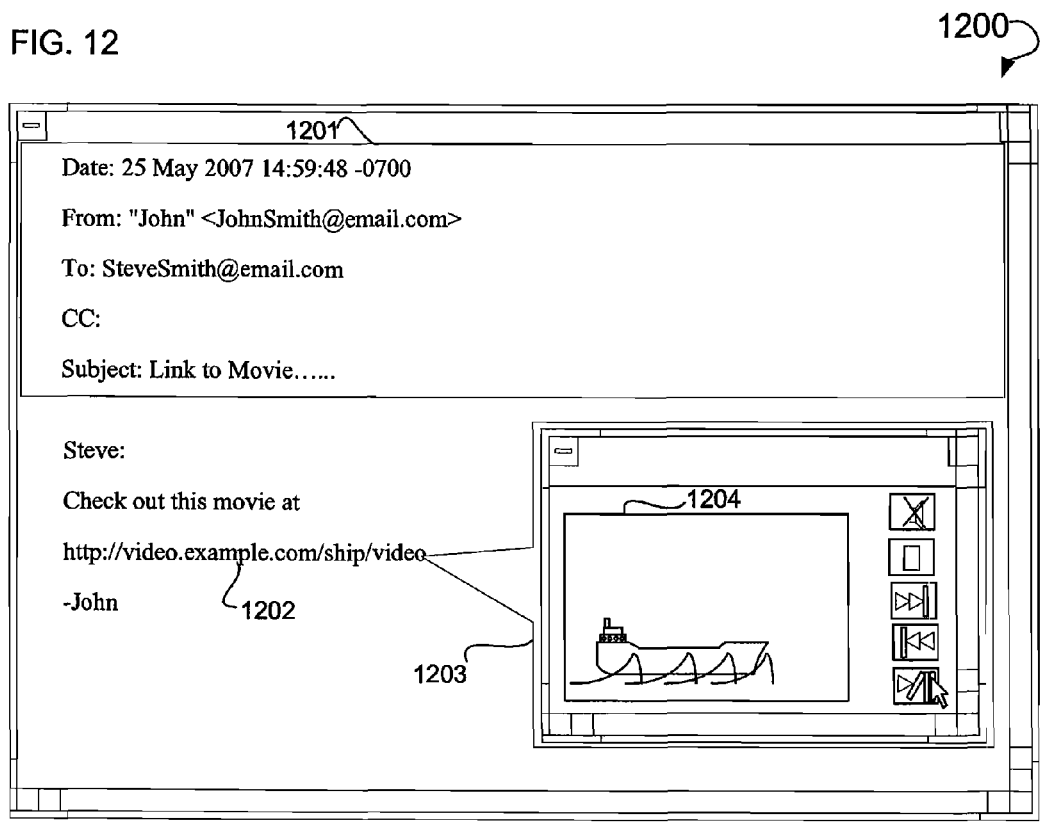
FIG. 12 is a GUI illustrating an e-mail client containing a preview frame, according to an example embodiment.

FIG. 12 is an example GUI 1200 illustrating an e-mail client shown as an e-mail client 1201. This e-mail client (e.g., a document generator) may be, for example, an HTML-based e-mail client, or some other suitable e-mail client, and, more specifically, the interface for this e-mail client. Further, illustrated is a URL 1202 associated with an e-mail message. In certain cases, a user 101 may, for example, perform a mouse-over or other operation on the URL value such that a preview frame 1203 is generated containing a display area 1204. In certain cases, the URL value may be an attachment to an email that may be retrieved. This preview frame 1203 will enable, for example, the recipient of the e-mail message (e.g., Steve Smith) to preview content referenced in an e-mail, which in this case is video content. They may be able to preview this content without having to actually change Web pages or go to the Web site containing the referenced digital content.

Figure 13:
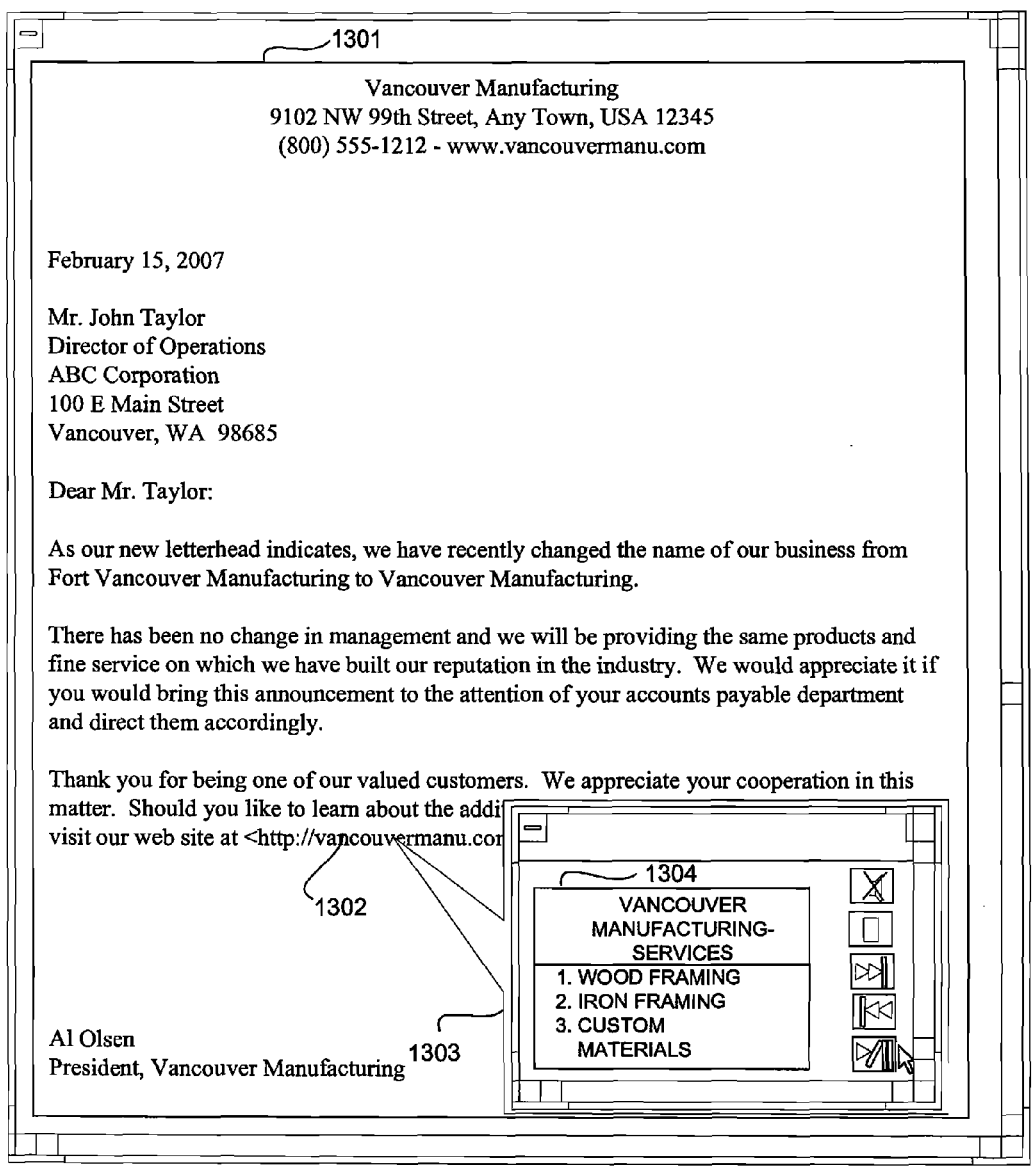
FIG. 13 is a GUI illustrating an electronic document containing a preview frame, according to an example embodiment.

FIG. 13 is an example GUI 1300 illustrating an electronic document 1301. Shown is an electronic document 1301 containing a URL value 1302. This document may be created with a document generator such as an HTML editor, word processing application, or other suitable document generator. When the user 101 performs a mouse-over, or other type of input/output operation on the URL 1302, a preview frame 1303 appears containing a display area 1304. In this particular example, a display area 1304 illustrates the Web page associated with the URL 1302 embedded in the electronic document 1301. In certain cases, a user 101 is able to preview a Web page referenced by a URL embedded in electronic documents (e.g., 1301) using a preview frame such as preview frame 1303. This will allow a user 101 to preview a Web page without having to actually go to that Web page and thereby divert their attention away from, for example, electronic document 1301.

Example Method

Figure 14:
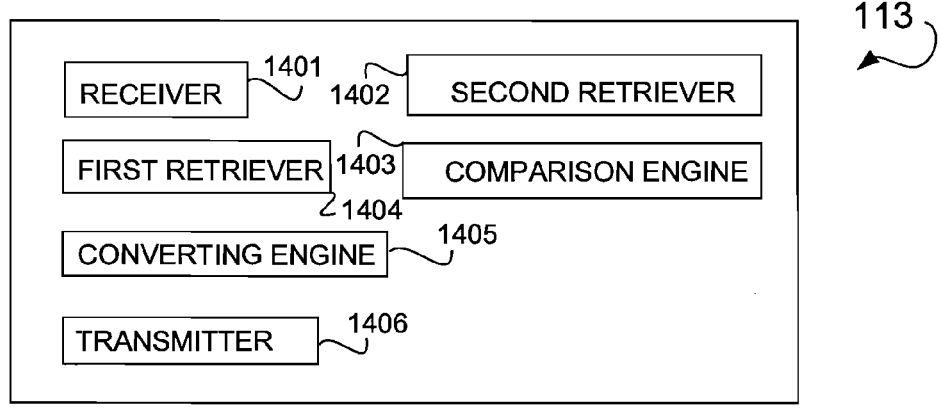
FIG. 14 is a block diagram of an example computer system in the form of an application server, according to an example embodiment.

FIG. 14 is a block diagram of a example computer system in the form of an application server 113, and some of the functional blocks associated therewith. In some embodiments, these blocks may be implemented in hardware, firmware, or even software. Illustrated is a application server 113 that includes a receiver 1401 to receive a digital content request relating to digital content accessible using a resource identifier, a first retriever 1404 to retrieve the digital content using the resource identifier, a converting engine 1405 to convert the digital content into formatted digital content having a file format different from that of the digital content, and compatible to be displayed in a preview frame, and a transmitter 1406 to transmit the formatted digital content. Further, the transmitter 1406 may be used to transmit the formatted digital content as a preview data stream. Additionally, the resource identifier may be a resource identifier that identifies a source from which the digital content is retrievable. Further, the digital content request for application server 113 may include at least one of a resource identifier, preview frame data, or plug-in support data. Additionally, in some embodiments, the application server 113 may include a second retriever 1402 to retrieve the digital content from a source identified by the resource identifier, the source being a native data source. Moreover, this second retriever 1402 may also retrieve the digital content from a source identified by the resource identifier, the source being a remotely located third-party content source. A comparison engine 1403 may also be part of the application server 113 to compare a first format relating to the digital content to a second format supported by the preview frame to determine whether a conversion from the first format to a second format needs to take place.

Figure 15:
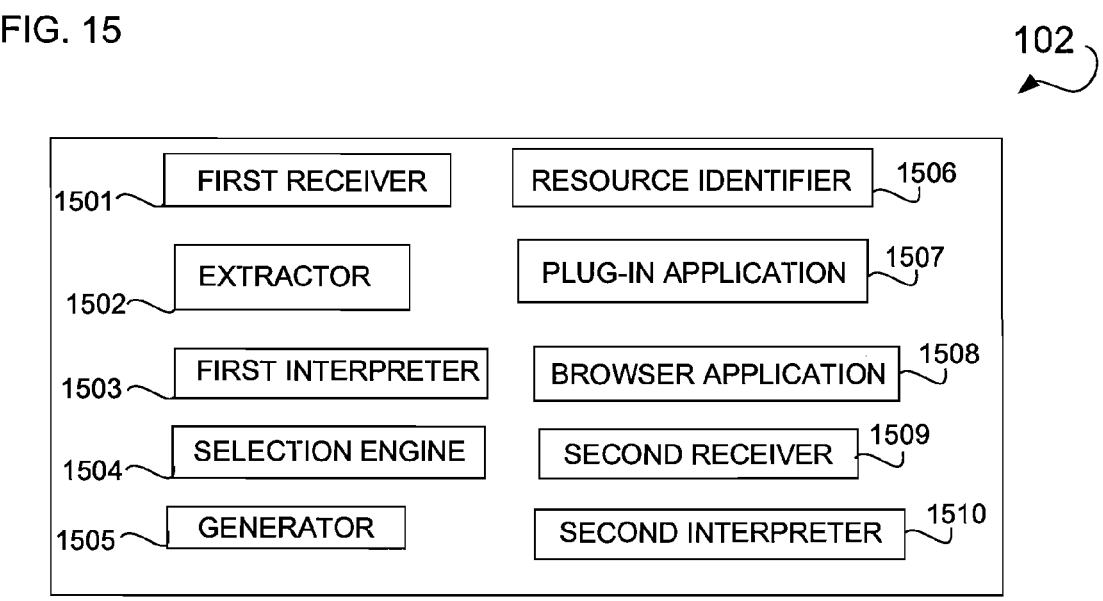
FIG. 15 is a block diagram of an example computer system in the form of a device[s], according to an example embodiment.

FIG. 15 is a block diagram of an example computer system in the form of a device[s] 102, and some of the functional blocks associated therewith. In some embodiments, these blocks may be implemented in hardware, firmware, or even software. Illustrated is a device[s] 102 that includes a first receiver 1501 to receive an search result, the search result containing a resource identifier, an extractor 1502 to extract the resource identifier from the search result, and associating a file format description with the resource identifier, and a first interpreter 1503 to interpret and display the search result and the file format description. This device 102 may also include a selection engine 1504 to select the file format description, the selecting conducted using an Input/Output (I/O) device, and a generator 1505 to generate a preview request, the preview request containing the resource identifier. Also, a resource identifier 1506 may also be implemented to identify the resource identifier to determine a supported file format. Additionally implemented may be a plug-in application 1507 associated with a browser application to extract the resource identifier from the search result, and associating the file format description with the resource identifier. Moreover, a browser application 1508 may be implemented to interpret and display the search result and the file format description. Further, implemented may be the generator 1505 to generate a preview frame, the preview frame taking up less display area than an associated primary application, and used to display digital content identified by the resource identifier, a second receiver 1509 to receive a preview data stream, the preview data stream containing the digital content in a format supported by the preview frame, and a second interpreter 1510 to interpret and display the digital content in the preview frame. In some embodiment, a document generator may be used to generate a document, to insert a resource identifier into this document and to associate a file format description with this resource identifier, the file format description to be used to display content in a preview frame. This document generator and association engine may reside on, for example, the one or more devices 102.

Figure 16:
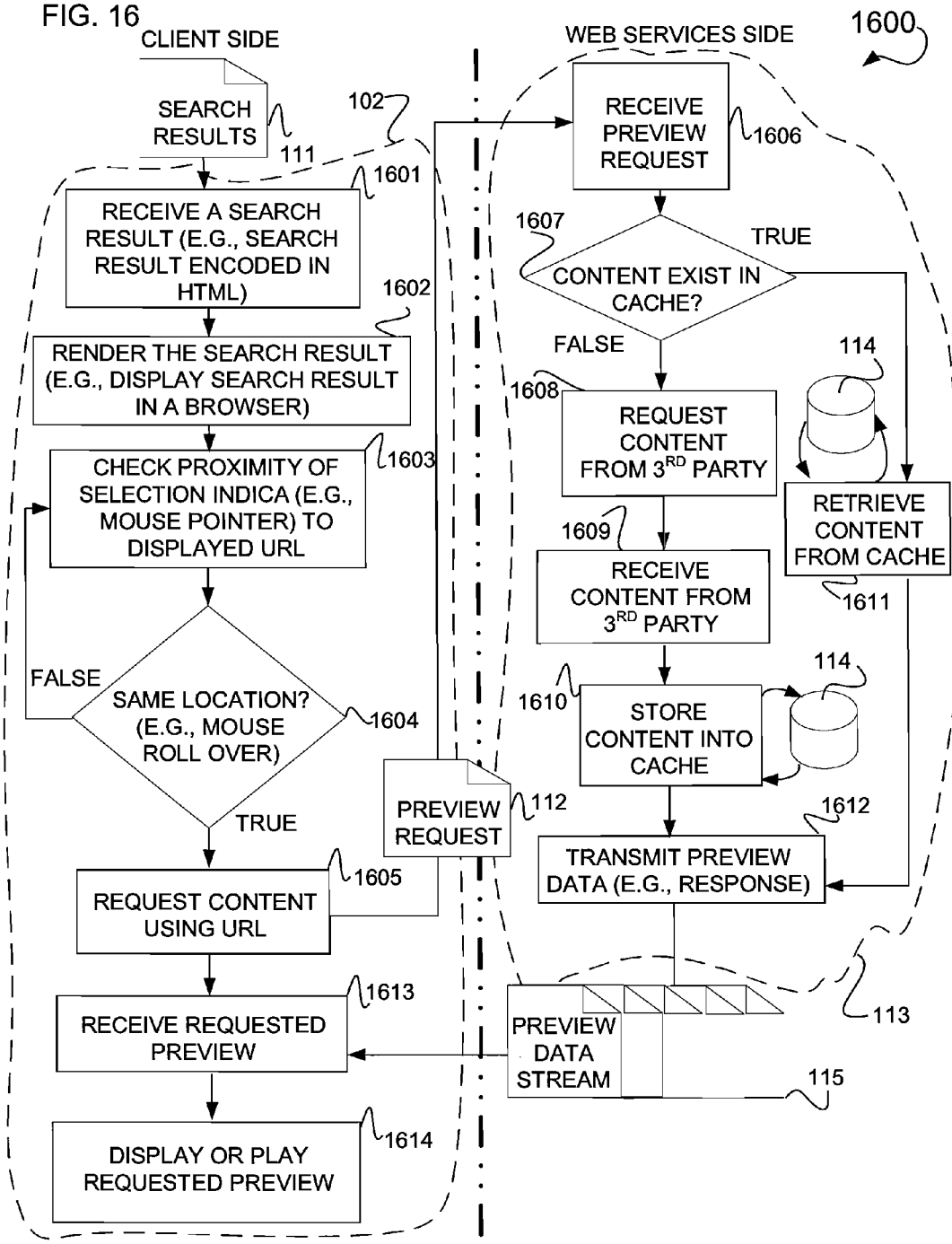
FIG. 16 is a dual stream flowchart illustrating an example method to retrieve and play digital content in a preview frame, according to an example embodiment.

FIG. 16 is a dual stream flowchart illustrating an example method 1600. Illustrated as a first stream titled "Client Side," and a second stream titled "Web Services Side." Starting with the Client Side, a search result 111 may be provided to a client device, such as one or more of the devices 102 or even the previously illustrated proxy server 201. Once the search results 111 are received, an operation 1601 is executed that actually receives the search results wherein the search results may be, for example, encoded in HTML. Next, an operation 1602 is executed that renders the search results such that the search results may be displayed in a browser application. Then, an operation 1603 is executed that determines the proximity of a selection indicia (e.g., a mouse pointer) to a URL displayed as a part of the search result 111. The decisional operation 1604 is then executed that determines whether or not the selection indicia is actually within the same proximity as the displayed URL. In cases where decisional operation 1604 evaluates to "false," then operation 1603 is re-executed. However, in cases where decisional operation 1604 evaluates to "true," then a further operation 1605 is executed that requests the content associated with the URL via a preview request 112. This preview request 112 is then sent to the application server 113.

With regard to the Web Services side of the dual stream flowchart, an operation 1606 is executed that receives the preview request 112. Next, a decisional operation 1607 is executed that determines whether or not the content illustrated within the preview request 112 is contained within the content cache 114 that is operatively coupled to the application server 113. In certain cases, the content in the cache may be converted content, while in other cases the content may still be in its original format where this original format is supported by the one or more devices 102. In cases where decisional operation 1607 evaluates to "true," a further operation 1611 is executed that actually retrieves the content from the content cache 114. This retrieval may be based on the uniquely identifying URL value associated with the particular requested content contained in the preview request 112. When this content is retrieved from the content cache 114 by the execution of the operation 1611, a further operation 1612 may be executed that generates the previously illustrated preview data stream 115. In cases where decisional operation 1607 evaluates to "false," an operation 1608 is executed that requests content from a third party (e.g., 117, 119, or 120). Next, an operation 1609 is executed that receives the content (e.g., requested content in original format 118) from the third party. Once received, this request content is stored into the content cache 114 via the execution of an operation 1610. After storage into the content cache 114, wherein this content is stored based on the uniquely identifying URL value, the previously illustrated operation 1612 is executed wherein a preview data stream 115 is generated. This preview data stream 115, whether containing content retrieved from a third party or content retrieved from the content cache 114, is then transmitted back to the one or more devices 102 or proxy server 201 (e.g., referenced herein as the Client's Side). An operation 1613 is executed that receives the requested preview, which in this case is the preview data stream 115. Then, an operation 1614 is executed that displays or plays the requested preview in the previously illustrated preview frame 607, 702, 802, 902, 1003, or 1103.

FIG. 17 is a flowchart illustrating an example method used to execute operation 1601. Illustrated is an operation 1701 that parses a search results (e.g., 111) looking for URL data. Next, an operation 1702 is executed that retrieves a list of supported plug-ins from, for example, a plug-in library 1703. Then, an operation 1704 is executed that inserts a preview link as a textual description or iconic representation to be associated with the appropriate URL value. This preview link is then inserted into search results to be displayed by a primary application such as a browser. For example, in some embodiments, a URL value otherwise displayed as a part of a Web page depicting various search results is replaced with a textual representations, such as "View as flash" or "View as PDF" (see e.g., 701, 801 or 901). Further, the an iconic representation may be used (see e.g., . . . ). In other cases, the URL value itself is illustrated (see e.g., search result 603, 605, 606, or 608).

FIG. 18 is a flowchart illustrating an example method used to execute operation 1704. Illustrated is an operation 1801 that receives URL data and a list of supported plug-ins. Once this URL data and list of supported plug-ins is received, a decisional operation 1802 is executed wherein the decisional operation 1802 determines the file type associated with URL. In certain cases, a URL data will explicitly state the particular file type to which it points, such as a PDF™ file, an SWF™ file, or even a PPT™ file. In other cases, however, this file type descriptor may not be present in the URL data such that the URL data will actually have to be used (e.g., a link executed by the browser or plug-in application), executed to determine the file type. In cases where decisional operation 1802 evaluates to "true" (e.g., the file type can be known from examining the URL data), a further decisional operation 1804 is executed. In cases where decisional operation 1802 evaluates to "false," an operation 1803 is executed that initiates a session setup to determine a file type. In certain cases where the file type cannot be gleaned from the URL data itself, the URL data must be used, as previously illustrated, to determine what the file type is associated with the URL data. This may involve, for example, actually initiating a setup (e.g., transmitting a setup data packet 401) such that the file type can be determined. Once operation 1803 is executed and the file type determined, the previously referenced decisional operation 1804 may be executed wherein a determination is made as to whether or not the file type is supported. In cases where decisional operation 1804 evaluates to "false," an operation 1806 is executed that transmits an unsupported format message. In cases where decisional operation 1804 evaluates to "true," a further operation 1805 is executed that proceeds with inserting a preview link into the search results (e.g., 701, 801, or 901).

Figure 19:
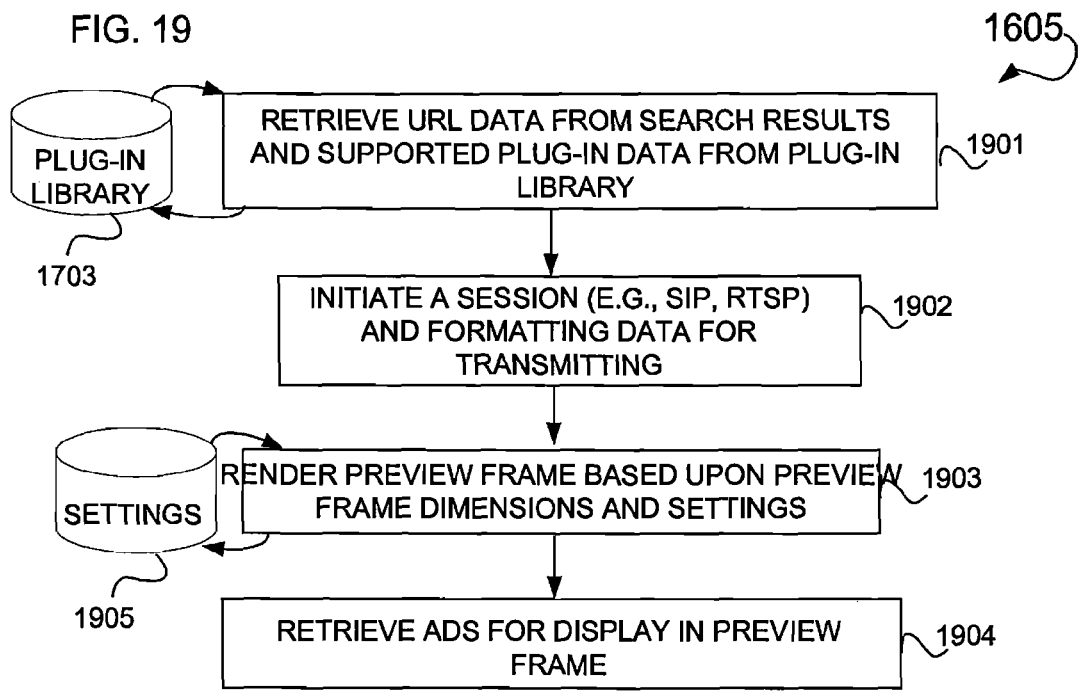
FIG. 19 is a flowchart illustrating an example method used to execute an operation that requests content associated with a URL value via a preview request, according to an example embodiment.

FIG. 19 is a flowchart illustrating an example method used to execute operation 1605 used to generate a preview request 112. Illustrated is an operation 1901 that retrieves URL data from particular search results and the supported plug-in data from a plug-in library. Once this information is retrieved, an operation 1902 is executed that initiates a session using, for example, the session setup packet 401, wherein the session may be a SIP session, RTSP session, or some other suitable session. During the course of initiating a session, certain types of formatting data may be transmitted along, as illustrated in FIG. 5, with the session setup data packet 401. This data may include, for example, preview frame information. Next, an operation 1903 is executed that renders a preview frame based on preview frame dimensions and settings. This settings information may be obtained from a settings data store 1905. Then, an operation 1904 is executed that may retrieve advertisements for display in the preview frame. These advertisements may be text based, images, video, audio, audio/video or some combination of these formats.

In some embodiments, operation 1904 may be implemented in any one of a number of ways. For example, in one embodiment, the advertisements retrieved by operation 1704 may reside natively on the one or more devices 102, the proxy server 201, or may be sent by, for example, the application server 113 prior to the display of the preview data stream 115 within the preview frame (e.g., 607, 702, 802, 902, 1203, or 1303). In another, or even the same example embodiment, the advertisements (e.g., advertising data) need not be fetched prior to (e.g., rather may be retrieved after or contemporaneously with) the receiving of preview data stream 115. This advertising data may be independently fetched once data from the preview data steam 115 is received (e.g., may be retrieved on the basis of preview data stream content or search result query). Moreover, this fetching may be dynamic in nature such that the advertising data is constantly fetched, or fetched based upon the selection of certain preview links, such that a selected preview link dictates the type of advertising data to be fetched. Further, in some embodiments, this advertising data can be shown in a separate frame embedded within preview frame (see e.g., display area 1101, and frames 1102 and 1103). Additionally, this advertising data may be retrieved form one or more servers remotely located from the application server 113 and/or the one or more devices 102.

Figure 20:
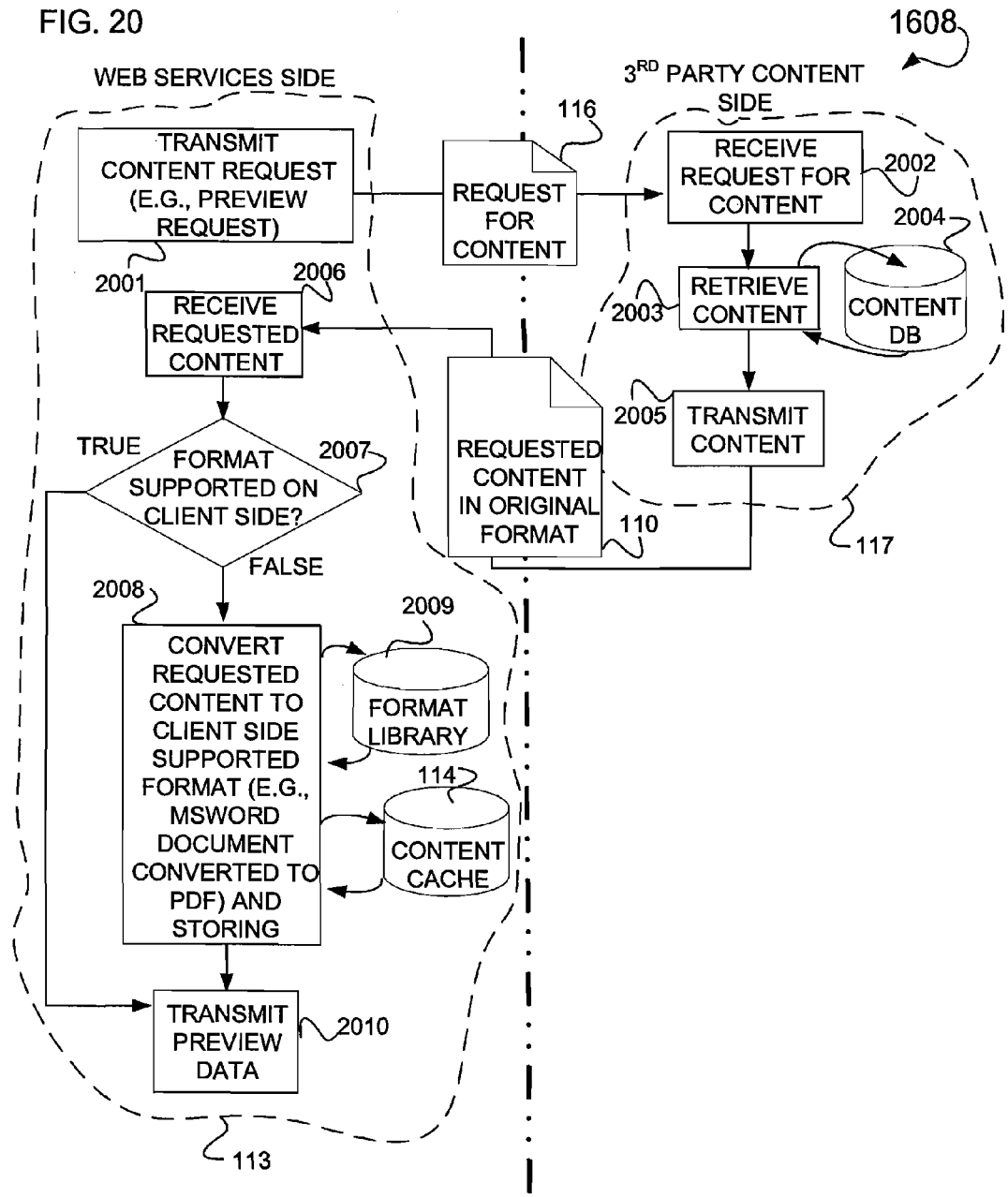
FIG. 20 is a dual stream flowchart illustrating an example method used to execute an operation that requests content from a third party, according to an example embodiment.

FIG. 20 is a dual stream flowchart illustrating an example method used to execute operation 1608. Illustrated is a first stream titled "Web Services Side," and a second steam titled "Third Party Content Side." This Web Services Side may, for example, illustrate the functionality and operations associated with the application server 113, whereas the Third Party Content Side may show the functionality and operations associated with a third-party content site 117, 119, or even 120. Illustrated is an operation 2001 that transmits a content request, for example derived from a preview request 112, as a request for content 116 to a third-party content site such as third-party content site 117. Residing on third-party content site 117 is an operation 2002 that, when executed, receives a request for content. Once received, an operation 2003 is executed that actually retrieves the content from, for example, a content database 2004. This request for content 116 may be, for example, an HTTP-based content request, wherein HTTP is used to access this content, or may be, for example, an RTSP-based content request. Next, an operation 2005 is executed that actually transmits the retrieved content wherein, more specifically, the content is the requested content in its original format as depicted herein by 118. Further, an operation 2006 is executed that resides on, for example, the application server 113 that when executed receives the request for content as the requested content in original format 118. Once received, a decisional operation 2007 is executed that determines whether the format of the requested content 118 is supported on the client side (e.g., that is, whether it is supported by, for example, the one or more devices 102 or even proxy server 201). In cases where decisional operation 2007 evaluates to "true," an operation 2010 is executed that actually transmits the preview data as, for example, a preview data stream 115.

In cases where the format is not supported on the client's side (e.g., decisional operation 2007 evaluates to "false"), a further operation 2008 is executed that converts the requested content from its original format to a format supported by the client side, and stores this converted content. For example, if the requested content in original format 118 is formatted as a MICROSOFT WORD™ document it may be converted to, for example, a PDF™ file. And again, if the requested content is a Motion Picture Expert Group (MPEG) formatted file it may be converted to an SWF file. Upon conversion, the requested and now converted content is stored into the content cache 114 for future use. Once conversion takes place and the previously illustrated operation 2010 is executed, the converted content is provided to the preview frame as the preview data stream 115.

In certain cases the converted content is only streamed to the preview frame and is not provided as an entire file to the preview frame. In some embodiments, the application server 113 may contain a plurality of applications that the client side device (e.g., one or more of the devices 102 and/or proxy server 201) may not have, but that the application server 113 does have. This may allow, for example, for the user 101 to have access to a wider variety of digital content than they would otherwise be able to have access to by virtue of the fact that they were not able or not able to support a particular file format due to certain limitations associated with the software residing on the one or more devices 102 or proxy server 201. This conversion process or operation as illustrated in 2008 may be provided to the user 101 on a pay-per-use basis, a subscription basis, or some other basis whereby the user 101 may pay to use this conversion operation. In other cases, however, there is no payment by the user 101 for this conversion operation.

Figure 21:
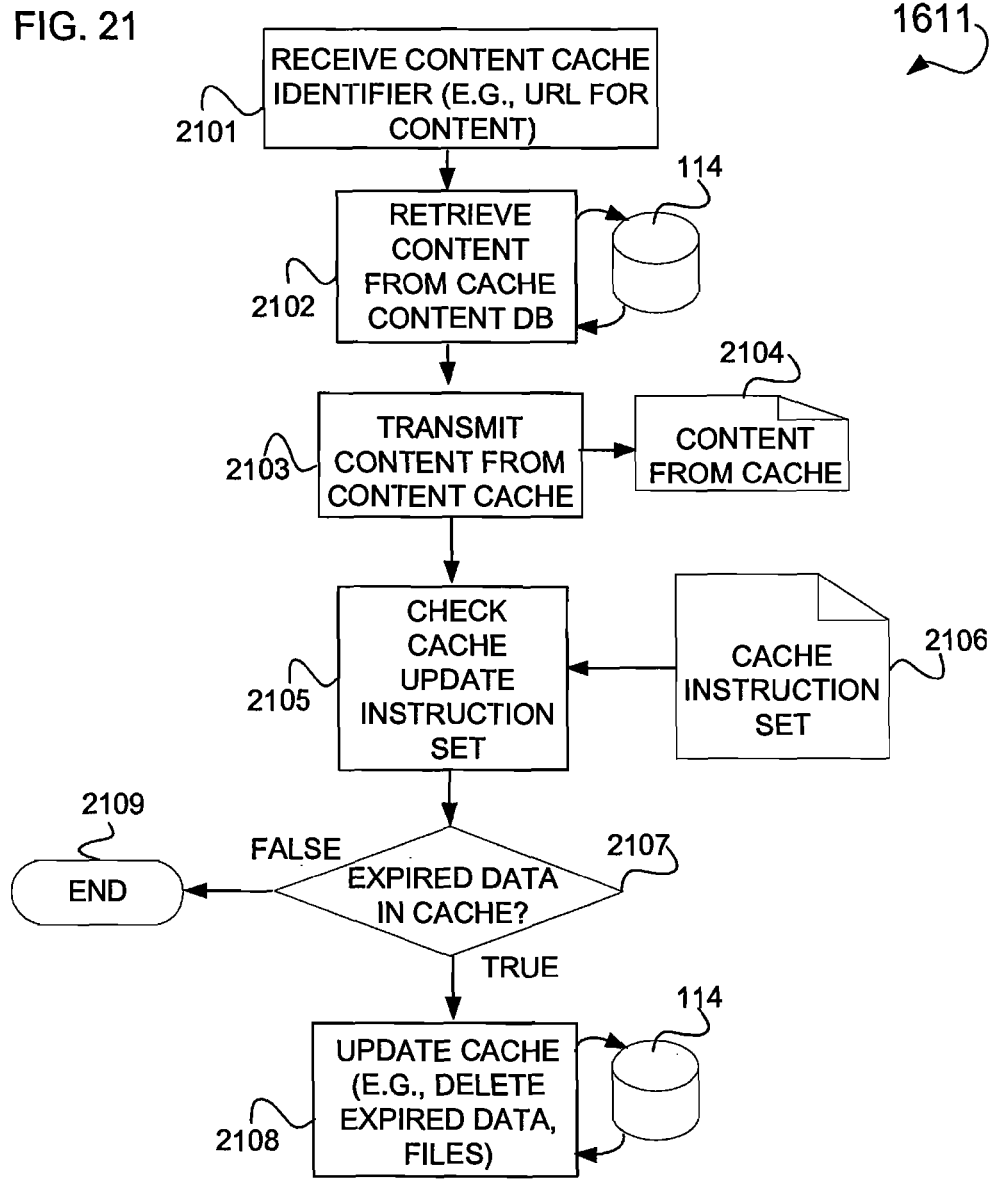
FIG. 21 is a flowchart illustrating an example method used to execute an operation that retrieves content from a content cache, according to an example embodiment.

FIG. 21 is a flowchart illustrating an example method used to execute operation 1611. Illustrated is an operation 2101 that receives a content cache identifier such as a URL value. Once received, an operation 2102 is executed that retrieves content from the content cache database 114. This retrieval may be based on using, for example, a Structured Query Language (SQL) call or some other type of database call. Next, an operation 2103 is executed that transmits the content from the cache as a content or cache value 2104. Then, an operation 2105 is executed that tracks the cache based upon certain update instructions, these update instructions provided by a cache instruction set 2106. In certain cases the cache instruction set may instruct a decisional operation 2107 to execute that determines whether the data in the cache has expired. In cases where decisional operation 2107 evaluates to "false," a termination operation 2109 is executed. In cases where a decisional operation 2107 evaluates to "true," a further operation 2108 is executed that updates the cache, such as the content cache 114. This update may be in the form of, for example, deleting certain types of expired data files that are expired based on some type of time value as defined in the content cache instruction set 2106.

Figure 22:
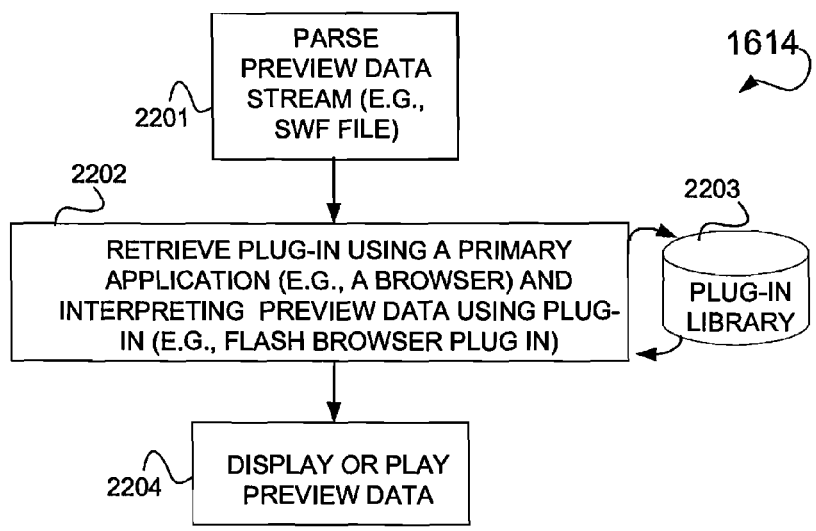
FIG. 22 is a flowchart illustrating an example method used to execute an operation that displays or plays a requested preview in a preview frame, according to an example embodiment.

FIG. 22 is a flowchart illustrating an example method used to execute operation 1614. Illustrated is an operation 2201 that parses a preview data stream 115 wherein this preview data stream 115 may be in the form of portions of an SWF file. Next, an operation 2202 is executed that retrieves a plug-in using a primary application such as a browser, and then interprets this preview data stream 115 using the plug-in. For example, this plug-in may be a FLASH™ plug-in associated with a browser application. This plug-in may be obtained from, for example, a plug-in library 2203 that resides on the one or more devices 102, or the proxy server 201. Next, an operation 2204 is executed that displays or plays the preview data coming from the preview data stream 115 and a preview frame, such as preview frame 607, 702, 802, 902, 1003, or 1103.

In some embodiments, a method is illustrated as including receiving a digital content request relating to digital content accessible using a resource identifier (see e.g., operation 1606), retrieving the digital content using the resource identifier (see e.g., operation 1611), converting the digital content into formatted digital content having a file format different from that of the digital content, and compatible to be displayed in a preview frame (see e.g., operation 2008), and transmitting the formatted digital content (see e.g., operation 1612). Additionally, in some embodiments, a method is illustrated as including receiving a search result, the search result containing a resource identifier (see e.g., operation 1601), extracting the resource identifier from the search result, and associating a file format description with the resource identifier (see e.g., operation 1601), and interpreting and displaying the search result and the file format description (see e.g., operation 1602).

Example Database

Some embodiments may include the various databases (e.g., 114) being relational databases or in some cases OLAP based databases. In the case of relational databases, various tables of data are created and data is inserted into, and/or selected from, these tables using SQL or some other database-query language known in the art. In the case of OLAP databases, one or more multi-dimensional cubes or hypercubes containing multidimensional data from which data is selected from or inserted into using MDX may be implemented. In the case of a database using tables and SQL, a database application such as, for example, MYSQL™, SQLSERVER™, Oracle 8I™, 10GT™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. These tables or cubes made up of tables, in the case of, for example, ROLAP, are organized into a RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, optimization algorithm known in the art.

Figure 23:
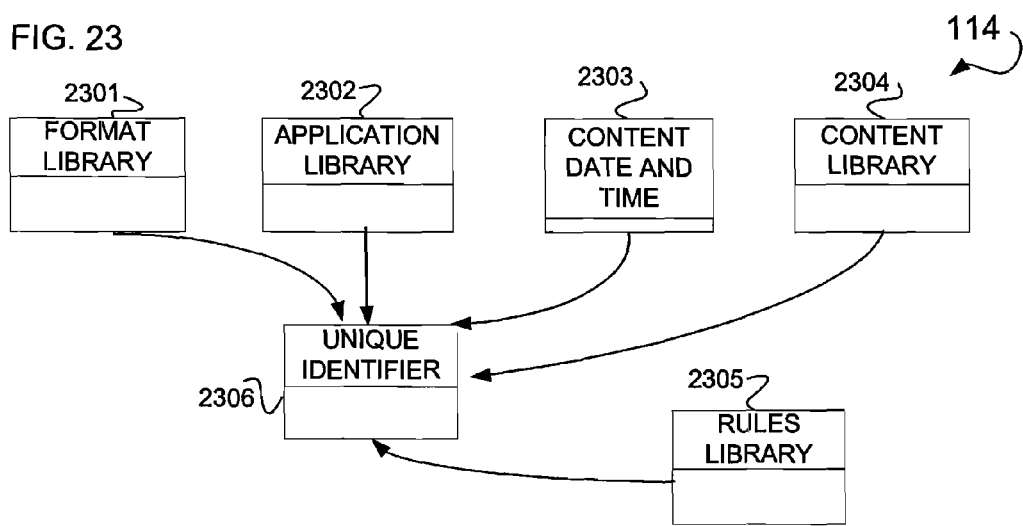
FIG. 23 is a Relational Data Schema (RDS) describing data and relations between data, according to an example embodiment.

FIG. 23 is an example Relational Data Schema (RDS) relating to various data tables that may be contained on, for example, the content cache 114. Illustrated is a table 2301 titled "Format Library" that may contain the various formats that are supported by the application server 113. These formats may be, for example, a string data type description of, for example, a PPT™ file, an SWF™ file, a PDF™ file, or some other suitable supported format. Further, an application library table 2302 is illustrated that contains the actual applications associated with the particular formats. Here, for example, an application may be stored as a Binary Large Object (BLOB) in its entirety, and may be accessed for the purposes of conversion as illustrated in operation 1608. Additionally, a table 2303 is illustrated that contains content, time, and date information. For example, contained within this table may be a content and date data type, a string data type, or some other suitable data type for representing the date upon which a particular piece of digital content was stored into the content cache 114. Further, a table 2304 is illustrated, titled "Content Library." This table 2304 may contain the actual cached digital content, wherein this digital content is cached in the form of a BLOB data type, or other suitable data types such that a PDF™ file, SWF™ file, PPT™ file, or other supported file as defined in the format library 2301 may be stored. Further, a table 2305 titled "Rules Library" may also reside on the content cache 114 database. This rules library may contain certain rules relating to, for example, determining whether or not a piece of content stored in the content library 2304 is stale, or otherwise should be removed due to its age or other types of rules. Further, a unique identifier table 2306 is illustrated wherein each of the entries in the various tables (e.g., 2301, 2302, 2303, 2304, or 2305) are uniquely identified. In certain cases, as previously illustrated, the URL value for a particular piece of content may serve as a uniquely identifying value for each of the tables.

A Three-Tier Architecture

In some embodiments, a method is illustrated as implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free from application processing. Further, a second tier may be a logic tier that performs application processing in the form of logical/mathematical manipulations of data inputted through the interface level, and communicates the results of these logical/mathematical manipulations to the interface tier, and/or to a backend or storage tier. These logical/mathematical manipulations may relate to certain business rules or processes that govern the software application as a whole. A third storage tier may be a persistent storage medium or non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture and the technologies through which it is implemented, may be executed on two or more computer systems organized in a server-client, peer-to-peer, or so some other suitable configuration. Further, these three tiers may be distributed between more than one computer system as various software components.

Component Design

Some example embodiments may include the above illustrated tiers, and processes or operations that make them up, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various Application Programming interfaces (APIs), and then compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above illustrated components across a distributed programming environment as distributed computing components. For example, an interface component (e.g., an interface tier) may reside on a first computer system remotely located from a second computer system containing a logic component (e.g., a logic tier). These first and second computer systems may be configured in a server-client, peer-to-peer, or some other suitable configuration. These various components may be written using the above illustrated object-oriented programming techniques and can be written in the same programming language or a different programming language. Various protocols may be implemented to enable these various components to communicate regardless of the programming language used to write these components. For example, a component written in C++ may be able to communicate with another component written in the Java programming language using a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Some embodiments may use the OSI model or TCP/IP protocol stack model for defining the protocols used by a network to transmit data. In applying these models, a system of data transmission between a server and client, or between peer computer systems is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as the Internet, Local Area Network (LAN), Wide Area Network (WAN), or some other suitable network. In some cases, Internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

A Computer System

Figure 24:
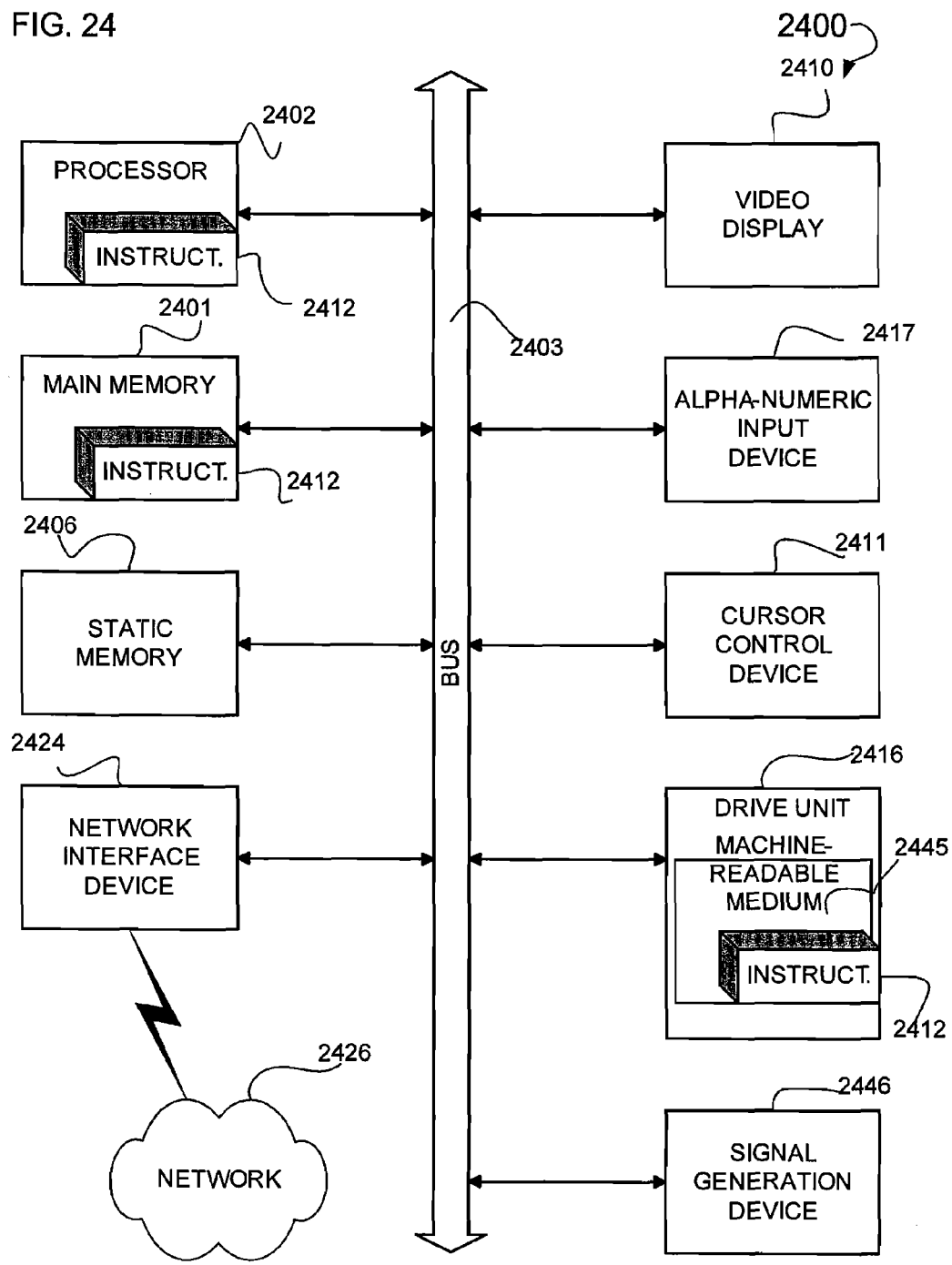
FIG. 24 shows a diagrammatic representation of a machine in the example form of a computer system that executes a set of instructions to perform any one or more of the methodologies discussed herein.

FIG. 24 shows a diagrammatic representation of a machine in the example form of a computer system 2400 that executes a set of instructions to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a PC, a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 2400 includes a processor 2402 (e.g., a Central Processing Unit (CPU), a Graphics Processing Unit (GPU) or both), a main memory 2401, and a static memory 2406, which communicate with each other via a bus 2403. The computer system 2400 may further include a video display unit 2410 (e.g., a Liquid Crystal Display (LCD) or a Cathode Ray Tube (CRT)). The computer system 2400 also includes an alphanumeric input device 2417 (e.g., a keyboard), a User Interface (UI) cursor controller 2411 (e.g., a mouse), a disk drive unit 2416, a signal generation device 2446 (e.g., a speaker) and a network interface device (e.g., a transmitter) 2424.

The drive unit 2416 includes a machine-readable medium 2445 on which is stored one or more sets of instructions and data structures (e.g., software) embodying or used by any one or more of the methodologies or functions illustrated herein. The software may also reside, completely or at least partially, within the main memory 2401 and/or within the processor 2402 during execution thereof by the computer system 2400, the main memory 2401 and the processor 2402 also constituting machine-readable media 2445.

The instructions 2412 may further be transmitted or received over a network 2426 via the network interface device 2424 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Marketplace Applications

In some embodiments, persons conducting on-line searches may want to preview the digital content linked to be the various search results. This preview will allow the search to review this digital content without having to leave the Web page displaying the search results. In some cases, the user will be able to sample the digital content associated with multiple search results. In one embodiment, the user will use a preview frame to sample this digital content. The preview frame may be a plug-in or other suitable browser associated application. The preview frame may be executed by the user associating a pointer position determined via an input device such as a mouse with the location of a Web page as illustrated in a search result (e.g., a URL embedded in the search result). A preview request may be then sent out to a Web services server that may retrieve the request preview data. In some cases, once retrieved, the preview data may be converted into some type of suitable format that the preview frame may be able to use.

The Abstract of the Disclosure is provided to comply with 37 C.F.R. §1.72(b), requiring an abstract that allows the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving a digital content request relating to digital content accessible using a resource identifier, the digital content request specifying a format selection;
   retrieving the digital content using the resource identifier, the digital content having a first file format, the first file format specific to a first application;
   converting, using one or more processors, the digital content into formatted digital content having a second file format specific to a second application, the second file format corresponding to the format selection and being different from the first file format, the formatted digital content compatible to be displayed in a preview frame; and
   transmitting the formatted digital content as part of a user interface including an indication that the digital content is available in the first file format and the second file format.

2. The method of claim 1, further comprising the transmitting of the formatted digital content wherein the formatted digital content is transmitted as a preview data stream.

3. The method of claim 1, wherein the resource identifier is a resource identifier that identifies a source from which the digital content is retrievable.

4. The method of claim 1, wherein the digital content request includes preview frame data or plug-in support data.

5. The method of claim 1, further comprising retrieving the digital content from a source identified by the resource identifier, the source being a native data source.

6. The method of claim 1, further comprising retrieving the digital content from a source identified by the resource identifier, the source being a remotely located third-party content source.

7. The method of claim 1, further comprising comparing the first file format of the digital content to the second file format compatible to be displayed by the preview frame to determine whether to convert the first file format to the second file format.

8. A method comprising:
   receiving a search result a resource identifier, the resource identifier used to retrieve digital content having a first file format specific to a first application, the resource identifier including a first file format description indicating the first file format;
   extracting, using one or more processors, the resource identifier from the search result;
   associating a second file format description with the resource identifier, the second file format description indicating a second file format specific to a second application; and
   displaying the search result at a first location in a user interface and, proximate to the first location, displaying a preview link indicating the second file format description, the user interface including an indication that the digital content is available in the first file format and the second file format.

9. The method of claim 8, further comprising:
   receiving a selection of the preview link indicating the second file format description from two or more preview links respectively indicating two or more supported file formats; and
   generating a preview request, the preview request containing the resource identifier and the second file format description.

10. The method of claim 8 further comprising using the resource identifier to determine a supported file format.

11. The method of claim 8, further comprising using a plug-in application associated with a browser application to extract the resource identifier from the search result, and associating the second file format description with the resource identifier.

12. The method of claim 8, further comprising using a proxy server to extract the resource identifier from the search result, and associating the second file format description with the resource identifier.

13. The method of claim 8, further comprising using a search engine to extract the resource identifier from the search result, and associating the first file format description with the resource identifier.

14. The method of claim 8, further comprising using a browser application to display the search result and the second file format description.

15. The method of claim 8, further comprising:
   generating a preview frame, the preview frame taking up less display area than an associated primary application, and used to display the digital content identified by the resource identifier;
   receiving a preview data stream, the preview data stream containing the digital content in the second file format; and
   displaying the digital content in the preview frame.

16. A system comprising:
a receiver to receive a digital content request relating to digital content accessible using a resource identifier, the digital content request specifying a format selection;
a first retriever to retrieve the digital content using the resource identifier, the digital content having a first file format, the first file format specific to a first application;
a converting engine, having one or more processors, to convert the digital content into formatted digital content having a second file format specific to a second application, the second file format corresponding to the format selection and being different from the first file format, the formatted digital content compatible to be displayed in a preview frame; and
a transmitter to transmit the formatted digital content as part of a user interface including an indication that the digital content is available in the first file format and the second file format.

17. The system of claim 16, wherein the transmitter is to transmit the formatted digital content as a preview data stream.

18. The system of claim 16, wherein the resource identifier is a resource identifier that identifies a source from which the digital content is retrievable.

19. The system of claim 16, wherein the digital content request includes preview frame data or plug-in support data.

20. The system of claim 16, further comprising a second retriever to retrieve the digital content from a source identified by the resource identifier, the source being a native data source.

21. The system of claim 16, further comprising a second retriever to retrieve the digital content from a source identified by the resource identifier, the source being a remotely located third-party content source.

22. The system of claim 16, further comprising a comparison engine to compare the first file format of the digital content to the second file format supported by the preview frame to determine whether to convert the digital content from the first file format to the second file format.

23. A system comprising:
a first receiver to receive a search result, the search result containing a resource identifier, the resource identifier used to retrieve digital content having a first file format specific to a first application, the resource identifier including a first file format description indicating the first file format;
an extractor, having one or more processors, to extract the resource identifier from the search result and associate a second file format description with the resource identifier, the second file format description indicating a second file format specific to a second application; and
a display to display the search result at a first location in a user interface and, proximate to the first location, displaying a preview link indicating the second file format description, the user interface including an indication that the digital content is available in the first file format and the second file format.

24. The system of claim 23, further comprising:
a selection engine to receive a selection of the preview link indicating the second file format description from two or more preview links respectively indicating two or more supported file formats; and
a generator to generate a preview request, the preview request containing the resource identifier and the second file format description.

25. The system of claim 23, further comprising a resource identifier to identify the resource identifier to determine a supported file format.

26. The system of claim 23, further comprising a plug-in application associated with a browser application to extract the resource identifier from the search result, and to associate the second file format description with the resource identifier.

27. The system of claim 23, further comprising a proxy server used to extract the resource identifier from the search result, and to associate the second file format description with the resource identifier.

28. The system of claim 23, further comprising a search engine used to extract the resource identifier from the search result, and to associate the second file format description with the resource identifier.

29. The system of claim 23, further comprising a browser application to display the search result and the second file format description.

30. The system of claim 23, further comprising:
a generator to generate a preview frame, the preview frame taking up less display area than an associated primary application, and used to display the digital content identified by the resource identifier;
a receiver to receive a preview data stream, the preview data stream containing the digital content in the second file format; and
a display to display the digital content in the preview frame.

31. An apparatus comprising:
means for receiving a digital content request relating to digital content accessible using a resource identifier, the digital content request specifying a format selection;
means for retrieving the digital content using the resource identifier, the digital content having a first file format, the first file format specific to a first application;
means for converting the digital content into formatted digital content having a second file format specific to a second application, the second file format corresponding to the format selection and being different from the first file format, the formatted digital content compatible to be displayed in a preview frame; and
means for transmitting the formatted digital content as part of a user interface, the user interface including an indication that the digital content is available in the first file format and the second file format.

32. A non-transitory machine-readable medium comprising instructions that, when implemented by one or more machines, cause the one or more machines to perform operations comprising:
receiving a digital content request relating to digital content accessible using a resource identifier, the digital content request specifying a format selection;
retrieving the digital content using the resource identifier, the digital content having a first file format, the first file format specific to a first application;
converting, using one or more processors, the digital content into formatted digital content having a second file format specific to a second application, the second file format corresponding to the format selection and being different from the first file format, the formatted digital content compatible to be displayed in a preview frame; and
transmitting the formatted digital content as part of a user interface, the user interface including an indication that the digital content is available in the first file format and the second file format.

* * * * *

UNITED STATES PATENT AND TRADEMARK OFFICE
CERTIFICATE OF CORRECTION

PATENT NO. : 8,578,261 B1  
APPLICATION NO. : 11/767064  
DATED : November 5, 2013  
INVENTOR(S) : Gupta et al.

Page 1 of 1

It is certified that error appears in the above-identified patent and that said Letters Patent is hereby corrected as shown below:

In the Claims

In column 20, line 16, in Claim 8, after "result", insert --containing--, therefor In column 20, line 41, in Claim 10, delete "claim 8" and insert --claim 8,--, therefor Signed and Sealed this
Third Day of June, 2014

Michelle K. Lee
*Deputy Director of the United States Patent and Trademark Office*